US012562893B2

(12) United States Patent
Yeomans et al.

(10) Patent No.: US 12,562,893 B2
(45) Date of Patent: Feb. 24, 2026

(54) QKD SWITCHING SYSTEM

(71) Applicant: ARQIT LIMITED, London (GB)

(72) Inventors: Andrew Yeomans, Hertfordshire (GB);
Daryl Burns, Gloucestershire (GB);
David Williams, Surrey (GB)

(73) Assignee: Arqit Limited, London (GB)

( * ) Notice: Subject to any disclaimer, the term of this
patent is extended or adjusted under 35
U.S.C. 154(b) by 147 days.

(21) Appl. No.: 18/274,429

(22) PCT Filed: Jan. 28, 2022

(86) PCT No.: PCT/GB2022/050232
§ 371 (c)(1),
(2) Date: Jul. 26, 2023

(87) PCT Pub. No.: WO2022/162381
PCT Pub. Date: Aug. 4, 2022

(65) Prior Publication Data
US 2024/0097893 A1      Mar. 21, 2024

(30) Foreign Application Priority Data

Jan. 29, 2021      (GB) ...................................... 2101310

(51) Int. Cl.
*H04L 9/08* (2006.01)
*H04B 10/70* (2013.01)

(52) U.S. Cl.
CPC ........... *H04L 9/0855* (2013.01); *H04B 10/70*
(2013.01)

(58) Field of Classification Search
CPC ... H04L 9/0855; H04L 45/60; H04L 2209/76;
H04B 10/70
See application file for complete search history.

(56) References Cited

U.S. PATENT DOCUMENTS 7,392,378 B1 * 6/2008 Elliott ................... H04L 9/0852
380/278
7,706,535 B1 * 4/2010 Pearson ................ H04L 9/0855
380/255

(Continued)

FOREIGN PATENT DOCUMENTS

EP          1848142          10/2007

OTHER PUBLICATIONS

Francesco Matera.; "Quantum Key Distribution In Optical Networks", 2020, IEEE, pp. 1-4. (Year: 2020).*

(Continued)

*Primary Examiner* — Matthew Smithers
(74) *Attorney, Agent, or Firm* — Dentons US LLP

(57) ABSTRACT

A quantum key distributed (QKD) apparatus for use with at
least two endpoint devices, the apparatus including QKD
links each having a communication medium with a quantum
channel and a classical channel, wherein each endpoint has
a QKD link connected to the QKD apparatus; transmitters to
transmit quantum transmissions over a quantum channel of
one of the QKD links; a classical transceiver component to
transmit/receive classical data over a classical channel of
one of the QKD links; and a controller to route data for
quantum transmission to an endpoint via a transmitter
assigned to the endpoint over a quantum channel of the QKD
link of the endpoint, route classical data to an endpoint via
a classical transceiver assigned to the endpoint over a
classical channel of the QKD link of the endpoint, and route
classical data over the classical channel of the QKD link of
an endpoint.

20 Claims, 12 Drawing Sheets

(56) References Cited

U.S. PATENT DOCUMENTS

| | | | | |
|---|---|---|---|---|
| 8,041,039 B2* | 10/2011 | Tajima | .................. | H04L 9/0855 |
| | | | | 380/279 |
| 8,650,401 B2* | 2/2014 | Wiseman | .............. | H04L 63/061 |
| | | | | 380/256 |
| 8,654,979 B2* | 2/2014 | Hicks | .................... | H04L 9/0852 |
| | | | | 380/278 |
| 8,683,192 B2* | 3/2014 | Ayling | ................... | H04B 10/70 |
| | | | | 713/153 |
| 8,755,525 B2* | 6/2014 | Wiseman | .............. | H04L 9/0852 |
| | | | | 380/278 |
| 11,251,947 B1* | 2/2022 | Wang | .................... | H04L 9/0891 |
| 11,616,645 B1* | 3/2023 | Wang | .............. | H04B 10/25754 |
| | | | | 380/278 |
| 2004/0184603 A1* | 9/2004 | Pearson | ................ | H04L 9/0855 |
| | | | | 380/28 |
| 2010/0293380 A1* | 11/2010 | Wiseman | .............. | H04L 9/0852 |
| | | | | 713/169 |
| 2011/0213979 A1* | 9/2011 | Wiseman | .............. | H04L 9/0844 |
| | | | | 713/171 |
| 2011/0228937 A1* | 9/2011 | Wiseman | .............. | H04L 9/0855 |
| | | | | 380/255 |
| 2011/0231665 A1* | 9/2011 | Wiseman | .............. | H04L 9/0855 |
| | | | | 713/181 |
| 2012/0002968 A1 | 1/2012 | Luo | | |
| 2012/0177200 A1* | 7/2012 | Harrison | .............. | H04L 9/0852 |
| | | | | 380/278 |
| 2012/0177201 A1* | 7/2012 | Ayling | ................. | H04L 9/0858 |
| | | | | 380/278 |
| 2014/0233739 A1* | 8/2014 | Grice | ................... | H04L 9/0855 |
| | | | | 380/278 |
| 2016/0006519 A1* | 1/2016 | Lail | ....................... | H04B 10/90 |
| | | | | 977/933 |
| 2016/0218867 A1* | 7/2016 | Nordholt | .............. | H04L 9/0852 |
| 2016/0233964 A1* | 8/2016 | Frohlich | .............. | H04B 10/85 |
| 2016/0234018 A1* | 8/2016 | Frohlich | ................ | H04B 10/70 |
| 2016/0248586 A1* | 8/2016 | Hughes | .................. | H04L 63/08 |
| 2020/0351086 A1* | 11/2020 | Walenta | .................. | H04L 9/083 |
| 2020/0389299 A1* | 12/2020 | White | ................... | H04B 10/85 |
| 2021/0091935 A1* | 3/2021 | Bush | .................... | H04L 9/0852 |
| 2021/0176055 A1 | 6/2021 | Rahman | | |

OTHER PUBLICATIONS

Tang et al.; "Quantum-Safe Metro Network With Low-Latency Reconfigurable Quantum Key Distribution", Nov. 15, 2018, Journal Of Lightwave Technology, vol. 36, No. 22, pp. 5230-5236. (Year: 2018).*

Ciurana et al.; "Quantum metropolitan optical network based on wavelength division multiplexing", Jan. 27, 2014, Optics Express vol. 22, No. 2, pp. 1-18. (Year: 2014).*

R. Wang et al., "End-to-end Quantum Secured Inter-Domain 5G Service Orchestration Over Dynamically Switched Flex-Grid Optical Networks Enabled by a q-ROADM", Journal of Lightwave Technology, vol. 38, No. 1, 2019, Jan. 1, 2020, pp. 1-11, XP011763706, issn: 0733-8724, DOI: 10.1109/JLT.2019.2949864 [retrieved on Dec. 31, 2019], abstract, paragraph [0001]-paragraph [0006].

Facultad De Informatica: "ISG QKD 017 NW architectures", ETSI Draft; QKD(20) 029025, European Telecommunications Standards Institute (ETSI), 650, Route Des Lucioles; F-06921 Sophia-Antipolis; France, vol. ISG QKD Quantum Key Distribution, No. 0.8, Dec. 13, 2020, pp. 1-48, XP014388658, Retrieved from the Internet: URL: ftp://docbox.et al.org/ISG/QKD(20) 029025_ISG_QKD_017_NW_architectures.zip QKD-017nwkArchv008.docx [retrieved on Dec. 13, 2020] paragraph [0004]-[0006].

Philip Chan et al., "Quantum Key Distribution", Arxiv.org, Cornell University Library, 201 Olin Library Cornell University Ithaca, NY 14853, Nov. 18, 2011, XP080540422, paragraph [0006].

Yoshimichi Tanizawa, et al., "A Routing Method Designed for a Quantum Key Distribution Network," 2016 Eighth International Conference on Ubiquitous and Future Networks (ICUFN), Jul. 2016, Vienna, Austria, INSPEC accession No. 16227543.

Search Report GB Application No. 2106977.8 dated Jun. 27, 2022.

Search Report GB Application No. 2101310.7 dated Jun. 27, 2022.

Jing Wang et al., "A Guide to Global Quantum Key Distribution Networks," Arxiv. Org., Cornell University Library, 201 Olin Library Cornell University, Ithaca, NY 14853, Dec. 28, 2020, XP081847709, pp. 1-17.

Imran Khan et al., "Satellite-Based QKD," Optics & Photonics New, Jan. 1, 2018, pp. 26-33, XP055876505, Retrieved from the Internet: URL:https://www.optica-opn.rg/opn/media/Images/PDF/2018/0218/26-33_OPN_02_18.PDF?EXT=.pdf[retrived on Jan. 5, 2022].

* cited by examiner

*170*

Route/switch quantum transmissions to end point — *171*

Route/switch classical data for transmission over classical channel of QKD link of end point — *172*

Route/switch classical transmission between end points over corresponding QKD links — *173*

QKD SWITCHING SYSTEM

This application is the National Stage filing under 35 U.S.C. 371 of International Application No. PCT/GB2022/050232, filed Jan. 28, 2022, claims the benefit of GB Application No. 2101310.7, filed Jan. 29, 2021, the contents of which are all hereby incorporated by reference herein in their entirety.

The present application relates to a system, apparatus and method for secure communications using a quantum key distribution switching apparatus and/or applications thereto.

BACKGROUND

Following the arrival of large-scale quantum computers, classical (e.g. factorisation and discrete-log based) key exchange methods for key agreement will be vulnerable and unable to provide security. Quantum key distribution (QKD) is a secure communication method which implements a cryptographic QKD protocol involving components of quantum mechanics for distributing cryptographic keys. It enables two parties with corresponding end-point devices to produce a shared random secret key or cryptographic key that is typically known only to them, which can then be used to encrypt and decrypt messages in communications between their endpoint devices. Although post-quantum algorithms offer an alternative to QKD, they suffer from the possibility of yet-to-be-discovered mathematical attacks on their foundations. QKD offers unconditionally-secure agreement of keys between two endpoint devices of two parties that possess an initial amount of shared secret material.

QKD has developed into a technology that allows cryptographic keys (or other secret material) to be distributed in a provably secure manner between two end-points, relying on proofs from quantum physics to ensure that data sent over a quantum-encoded link has not been intercepted. There are a number of challenges to expand QKD to multiple end-points. Current designs for a QKD network usually fall into three architectural patterns such as: 1) a first QKD architecture may be based on a mesh of terrestrial QKD links, connected together with trusted nodes acting as repeaters, with some form of routing between the trusted nodes. There are technical limitations on the locations of nodes, as current terrestrial QKD technologies have a distance limitation; 2) a second QKD architecture may be based on a mesh of terrestrial QKD links, where the quantum signals are switched between end-points. Prior art describes this being performed with optical switches, or by using beam-splitters to randomly route the quantum signals across the network. As well as the distance limitations, it is difficult to scale this type of switched network to thousands of end-points; or 3) satellite QKD technology has potentially global coverage without the need for any intermediate trusted nodes. However the complexity of the QKD transmitter/receiver technology and cost of end-point satellite QKD links is relatively high and is simply not affordable for mass-market deployment or deployment to scale.

For example, the BB84 QKD protocol is a well-known QKD protocol using photon polarisation bases or time-bin encoding or other modulation techniques to transmit the information. When using the BB84 QKD protocol over optical fibre links, time-bin encoding or any other suitable modulation technique may be better suited for optical fibre links than photon polarisation, although this may still be used. Although the following example implementation of a BB84 QKD protocol is described with reference to using photon polarisation over an optical free-space channel, this is byway of example only, the skilled person would appreciate that the BB84 QKD protocol may be designed to use other modulation techniques depending on the type of optical channel such as, without limitation, for example time-bin encoding and/or any other suitable modulation technique for the type of optical channel. All that is required is that the modulation technique is used to form a set of bases in which each basis in the set of bases is orthogonal and/or unique or distinguishable. In this example, when using photon polarisation, the BB84 QKD protocol may be implemented using a set of bases including least two pairs of conjugate photon polarisation bases (e.g. a set of bases including, without limitation, for example a rectilinear photon basis (e.g. vertical (0°) and horizontal (90°) polarisations) and diagonal photon basis (e.g. 45° and 135° polarisations) or the circular basis of left- and right-handedness etc.) In the BB84 protocol, QKD is performed between a sender endpoint device or apparatus (e.g. typically referred to as Alice) and a receiver endpoint device (e.g. typically referred to as Bob or Carol). The sender endpoint device or apparatus (also referred to herein as an intermediary or linking device) and receiver endpoint device are connected by a quantum communication channel which allows quantum information (e.g. quantum states) to be transmitted. The quantum channel may be, without limitation, for example, an optical fibre or optical free space. Furthermore, the sender device and receiver device also communicate over a non-quantum channel or public classical channel, without limitation, for example a fibre optic channel, telecommunications channel, radio channel, broadcast radio or the internet and/or any other wireless or wired communications channel and the like.

Sheng-Kai Liao, et. al. "*Satellite-to-ground quantum key distribution*", *Nature* volume 549, pages 43-47, 7 Sep. 2017, describes satellite-based QKD system using the BB84 protocol for distributing keys, where a satellite free-space optical quantum channel is produced using a 300-mm aperture Cassegrain telescope, which sends a light beam from a Micius satellite (e.g. Alice) to an optical ground receiving (OGR) station (e.g. Bob), which, without limitation, for example uses a Ritchey Chretien telescope for receiving the QKD photons over the satellite free-space optical quantum channel. For multiple endpoint device communications between two receiving endpoint devices, the sender endpoint device may arrange a BB84 QKD key for both the two endpoint devices to enable them to communicate with each other. Not only is such an SQKD system complex and costly, as both endpoint devices requires an OGR and associated optical receiving telescopes and the like, but the sender endpoint device also has access to the QKD key information, so needs to be a highly secure and trusted device. For satellite QKD, this may be achievable, however, for terrestrial QKD, it may not be possible to be able to fully trust a send endpoint device used for negotiating a QKD keys for secure communications between said two receiver endpoint devices.

There is a desire for a more improved terrestrial QKD communications system that enables a QKD network to be created between multiple endpoint devices and massively scales in a secure manner for use, without limitation, for example as a "last-mile" solution to connect offices and homes into a QKD network whilst keeping connection costs relatively low. There is a further desire for a terrestrial QKD communications system in which sender endpoint devices or apparatus (also referred to herein as intermediary or linking devices) may be assigned various levels of trust depending on where they are deployed from, without limitation, for example: a) trusted when deployed within a private exchange or trusted/secure environment that is inaccessible to unauthorised personnel; to b) limited level of trust or even untrusted when deployed in more accessible environments such as, without limitation, for example shops, and/or road-side cabinets and the like. There is a further desire to minimise the amount of equipment and/or optical fibre or communication medium material necessary for reducing bandwidth and/or cost, which leads to further scalability and/or security of such systems.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) of providing QKD communication links (or QKD links) to form a QKD communication network with a plurality of endpoints and for controlling data flow over the QKD communication links to one or more of the plurality of endpoints for use between multiple endpoints. A QKD linking apparatus acts as a hub and provides or assigns a QKD link to each endpoint of the plurality of endpoints and is configured control/switch/route data flowing via the QKD links to/from the endpoints to allow any endpoint to exchange quantum-encoded signals and classical signals with the QKD linking apparatus and/or any other endpoint via their quantum and classical channels of their corresponding QKD link. The QKD linking apparatus and one or more of the plurality of endpoints may perform any QKD protocol for securely exchanging keys via the quantum and classical channels provided by the corresponding QKD links of said one or more endpoints. Each QKD link may include a communications channel including at least a quantum channel and a classical channel that may share the same communication medium. One or more QKD links may share the same communication medium as one or more other QKD links. Two or more QKD links may also be configured to share the same communication medium. The QKD linking apparatus may include a controller configured to perform any QKD protocol for exchanging keys between endpoints and switch/route quantum and classical data flows in the appropriate sequence, depending on the QKD protocol being implemented, between the QKD linking apparatus and/or one or more endpoints via the quantum and classical channels of the QKD links of each of the endpoints. Thereafter, the controller may be configured to enable data flow between endpoints via the classical channels of the QKD links of the endpoints that allows secure communications between the endpoints.

In a first aspect, the present disclosure provides a quantum key distributed (QKD) linking apparatus for use with at least two endpoint devices for linking said endpoint devices in a QKD network, the QKD linking apparatus comprising: a plurality of QKD links, each QKD link having a communication medium comprising a quantum channel and a classical channel, wherein each endpoint is assigned a QKD link connecting said each endpoint to the QKD linking apparatus; a quantum transmission component comprising a plurality of quantum transmitters, each quantum transmitter configured for transmitting quantum transmissions over a quantum channel of one of the QKD links; a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum transmission component and the classical transceiver component, the controller configured to: route or switch data generated for quantum transmission to an endpoint via a quantum transmitter assigned to the endpoint over a quantum channel of the QKD link of the endpoint; route or switch classical data for classical transmission to an endpoint via a classical transceiver assigned to the endpoint over a classical channel of the QKD link of the endpoint; and route or switch classical data received by a classical transceiver over the classical channel of the QKD link of an endpoint as required.

As an option, the QKD linking apparatus according to the first aspect, wherein each QKD link has a dedicated quantum transmitter from the quantum transmission component and a dedicated classical transceiver from the classical transceiver component for use over the quantum channel and classical channel of the QKD link.

As another option, the QKD linking apparatus according to the first aspect, wherein the quantum transmission component further comprising a plurality of quantum receivers, each quantum receiver configured for receiving quantum transmissions over a quantum channel of one of the QKD links, wherein one or more of the QKD links has a dedicated quantum receiver from the quantum transmission component and a dedicated classical transceiver from the classical transceiver component for use over the quantum channel and classical channel of the QKD link, wherein the controller is further configured to route or switch data received by a quantum receiver from a quantum transmission over the quantum channel of the QKD link of an endpoint device assigned to the quantum receiver.

As a further option, the QKD linking apparatus according to the first aspect, the QKD linking apparatus further comprising a controller component configured for controlling the quantum transmission component for implementing one or more QKD protocols between the QKD linking apparatus and two or more of the endpoint devices, wherein: the controller component is configured to: assign an available quantum transmitter to an endpoint device for use over the QKD link of the endpoint device; and when implementing one of the QKD protocols between two or more endpoint devices each with an assigned quantum transmitters, direct the quantum transmission component to route or switch quantum transmissions for an endpoint device of the two or more endpoint devices to the quantum transmitter assigned to said endpoint device for transmitting said quantum transmissions over the quantum channel of the QKD link of the endpoint device.

Optionally, the QKD linking apparatus according to the first aspect, the QKD linking apparatus further comprising a controller component configured for controlling the classical transmission and routing component for implementing one or more QKD protocols between the QKD linking apparatus and two or more of the endpoint devices, wherein: the controller component is configured to: assign an available classical transceiver to an endpoint device for use over the QKD link of the endpoint device; when implementing one of the QKD protocols between two or more endpoint devices each with an assigned classical transceiver, direct the classical transmission and routing component to route or switch classical data for an endpoint device of the two or more endpoint devices to the classical transceiver assigned to said endpoint device to the classical channel of the QKD link of the endpoint device.

As an option, the QKD linking apparatus according to the first aspect, wherein, when one of the QKD protocols being performed between the QKD linking apparatus and at least two of the endpoint devices is complete, the controller is further configured to direct the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the two or more endpoint devices.

As another option, the QKD linking apparatus according to the first aspect, wherein the quantum transmitters are optical quantum transmitters and the classical transceivers are optical classical transceivers.

As an option, the QKD linking apparatus according to the first aspect, wherein the communication medium of one or more QKD links comprises at least one from the group of: any type of communication medium or media capable of being configured to form a quantum channel for transmission of quantum information and/or capable of being configured to form one or more classical communication channels for transmission of non-quantum or classical communications; capable of propagating an electromagnetic signal with wavelengths in the visible and/or non-visible electromagnetic spectrum; capable of propagating an electromagnetic signal with wavelengths in the visible light spectrum; capable of propagating an electromagnetic signal with wavelengths in the near-infra-red light spectrum; capable of propagating an electromagnetic signal with wavelengths in the infra-red spectrum; capable of propagating an electromagnetic signal with wavelengths in the microwave spectrum; capable of propagating an electromagnetic signal with wavelengths in the Terahertz wavelength spectrum; any other suitable electromagnetic wavelength for use in at least quantum communications and/or non-quantum communications; an optical communication medium capable of propagating electromagnetic signals with wavelengths in at least one from the group of: the visible light spectrum, the near-infrared light spectrum, the infra-red and the like; optical free-space; an optical cable; multi-mode optical fibre; single-mode optical fibre; one or more optical fibres; an optical fibre capable of propagating light in the wavelengths of at least one of the visible light spectrum and/or near-infra red light spectrum and the like.

Optionally, the QKD linking apparatus according to the first aspect, wherein the communication medium of each of the QKD links comprises at least one optical fibre.

As a further option, the QKD linking apparatus according to the first aspect, wherein the communication medium of at least one of the QKD links has a single optical fibre that is shared by the quantum and classical channels of said at least one QKD link.

As another option, the QKD linking apparatus according to the first aspect, wherein the quantum transmitter assigned to the endpoint of the QKD link and the classical transceiver assigned to the endpoint of the QKD link are coupled to the quantum channel and classical channel of the single optical fibre of the QKD link via a QKD link coupling arrangement.

As an option, the QKD linking apparatus according to the first aspect, wherein the QKD link coupling arrangement comprises one or more from the group of: one or more optical splitter/combiner device(s) or one or more optical multiplexor/demultiplexor device(s).

Optionally, the QKD linking apparatus according to the first aspect, wherein the communication medium, shared by the quantum and classical channels, of at least one of the QKD links comprises a first optical fibre for the quantum channel and a second optical fibre for the classical channel.

As a further option, the QKD linking apparatus according to the first aspect, wherein the communication medium, shared by the quantum and classical channels, of at least one of the QKD links comprises a first optical fibre for the quantum channel, a second and third optical fibres for the classical channel.

As another option, the QKD linking apparatus according to the first aspect, further comprising a plurality of homes or offices, each home or office associated with an endpoint device and corresponding QKD link, said QKD link connected between said endpoint device and said quantum transmission component and said classical transmission routing component.

As an option, the QKD linking apparatus according to the first aspect, further comprising a road-side cabinet housing the QKD linking apparatus with a backhaul QKD link of the QKD links connected to an exchange.

As a further option, the QKD linking apparatus according to the first aspect, wherein the QKD linking apparatus comprises a first QKD linking component comprising the quantum transmission component and controller, and a second QKD linking component comprising the classical transceiver routing component, wherein the first QKD linking component is located in a secure facility and the second QKD linking component is located in a public facility.

Optionally, the QKD linking apparatus according to the first aspect, wherein the secure facility is an exchange and the public facility is a roadside cabinet.

As another option, the QKD linking apparatus according to the first aspect, wherein the QKD linking apparatus comprises a first QKD linking component comprising the quantum transmission component and controller, and a second QKD linking component comprising the classical transceiver routing component, wherein the first QKD linking component is housed in a secure tamper-proof enclosure and the first and second QKD linking components are located in a public facility or roadside cabinet.

As a further option, the QKD linking apparatus according to the first aspect, further comprising a radio access network comprising a centralised unit and a plurality of radio masts/radio units configured to service a plurality of mobile units, said centralised unit and each radio mast/radio unit associated with an endpoint device and corresponding QKD link, said QKD link connected between said endpoint device and said quantum transmission component and said classical transmission routing component, wherein the QKD linking apparatus is located in a distributed unit of the radio access network.

Optionally, the QKD linking apparatus according to the first aspect, wherein the radio access network is a 5G radio access network.

As an option, the QKD linking apparatus according to the first aspect, wherein the radio access network is configured to using the QKD linking apparatus and appropriate QKD protocols for exchanging QKD keys, group keys and the like between the nodes, entities, network nodes/entities, components of the centralised unit, distributed unit and/or radio masts/radio units for forming part of a QKD network and/or thus enable quantum-safe or secure communications therebetween.

As a further option, the QKD linking apparatus according to the first aspect, wherein the QKD linking apparatus is an untrusted node and the QKD protocols performed by said QKD linking apparatus and said two or more endpoint devices are configured to ensure the QKD linking apparatus cannot derive the resulting QKD keys or keys exchanged output from the QKD protocols and used for securing communications between the two or more endpoint devices.

As another option, the QKD linking apparatus according to the first aspect, wherein the QKD protocol(s) may include one or more from the group of: a QKD protocol from the BB84 family of QKD protocols; the BB84 protocol; modified versions of the BB84 protocol configured to ensure the QKD linking apparatus is unable to derive the resulting exchanged QKD keys between the endpoint devices; and any other suitable QKD protocol for exchanging QKD keys between endpoint devices using quantum transmissions and classical transmissions.

Optionally, the QKD linking apparatus according to the first aspect, wherein the quantum transmissions to each endpoint device of two or more endpoint devices performing a QKD protocol for exchanging a QKD key therebetween may be performed simultaneously each quantum transmission using a different quantum transmitter assigned to said each endpoint device.

As an option, the QKD linking apparatus according to the first aspect, wherein the quantum transmissions to each endpoint device of two or more endpoint devices performing a QKD protocol for exchanging a QKD key therebetween may be performed sequentially using a different quantum transmitter assigned to said each endpoint device, wherein the controller directs the quantum transmission component to route or switch the next quantum transmission for an endpoint device to the corresponding quantum transmitter assigned to said endpoint device for transmission over the quantum channel of the QKD link of said endpoint device when the previous or current quantum transmission for another endpoint device has completed.

As another option, the QKD linking apparatus according to the first aspect, wherein the quantum transmission component includes a plurality of quantum receivers coupled to the quantum channel of corresponding QKD links of endpoint devices, wherein quantum transmissions received from each endpoint device of two or more endpoint devices performing a QKD protocol for exchanging a QKD key therebetween may be performed simultaneously, each reception of a quantum transmission using a different quantum receiver assigned to said each endpoint device.

As a further option, the QKD linking apparatus according to the first aspect, wherein the quantum transmission component includes a plurality of quantum receivers coupled to the quantum channel of corresponding QKD links of endpoint devices, and wherein the quantum transmissions from each endpoint device of two or more endpoint devices performing a QKD protocol for exchanging a QKD key therebetween may be performed sequentially using a different quantum receiver assigned to said each endpoint device, wherein the controller directs the quantum transmission component to route or switch the next expected quantum transmission from an endpoint device to the corresponding quantum receiver assigned to said endpoint device for reception of the quantum transmission over the quantum channel of the QKD link from said endpoint device when the previous or current quantum transmission from another endpoint device has completed.

As an option, the QKD linking apparatus according to the first aspect, further comprising a random number generator for generating random quantum bits or keys for quantum transmission.

As another option, the QKD linking apparatus according to the first aspect, wherein the QKD linking apparatus further deletes a generated random set of quantum bits or key once it has been transmitted to an endpoint device using quantum transmissions.

As an option, the QKD linking apparatus according to the first aspect, wherein each quantum transmitter of the quantum transmission component further comprises a faint pulse source, FPS, unit with optical switches for generating the photons in an integrated package with a plurality of matched laser diodes for coupling to the optical fibre of a QKD link.

In a second aspect, the present disclosure provides a computer-implemented method for controlling a quantum key distributed, QKD, linking apparatus for use in linking at least two endpoint devices in a QKD network, the QKD linking apparatus comprising: a plurality of QKD links, each QKD link having a communication medium comprising a quantum channel and a classical channel, wherein each endpoint is assigned a QKD link connecting said each endpoint to the QKD linking apparatus; a quantum transmission component comprising a plurality of quantum transmitters, each quantum transmitter configured for transmitting quantum transmissions over a quantum channel of one of the QKD links; a classical transceiver component comprising a plurality of classical transceivers, each classical transceiver configured for transmitting classical data over a classical channel of one of the QKD links and configured for receiving classical data over the classical channel of said one of the QKD links; and wherein the method further comprising: routing or switching data generated for quantum transmission to an endpoint via a quantum transmitter assigned to the endpoint over a quantum channel of the QKD link of the endpoint; routing or switching classical data for classical transmission to an endpoint via a classical transceiver assigned to the endpoint over a classical channel of the QKD link of the endpoint; and routing or switching classical data received by a classical transceiver over the classical channel of the QKD link of an endpoint as required.

As an option, the computer-implemented method according to the second aspect, further comprising: assigning an available quantum transmitter to an endpoint device for use over the QKD link of the endpoint device; and when implementing one of the QKD protocols between two or more endpoint devices each with an assigned quantum transmitters, directing the quantum transmission component to route or switch quantum transmissions for an endpoint device of the two or more endpoint devices to the quantum transmitter assigned to said endpoint device for transmitting said quantum transmissions over the quantum channel of the QKD link of the endpoint device.

As another option, the computer-implemented method according to the second aspect, further comprising assigning an available classical transceiver to an endpoint device for use over the QKD link of the endpoint device; when implementing one of the QKD protocols between two or more endpoint devices each with an assigned classical transceiver, directing the classical transmission and routing component to route or switch classical data for an endpoint device of the two or more endpoint devices to the classical transceiver assigned to said endpoint device to the classical channel of the QKD link of the endpoint device.

As a further option, the computer-implemented method according to the second aspect, when one of the QKD protocols are being performed between the QKD linking apparatus and at least two of the endpoint devices is complete, the method further comprising, for the two or more endpoint devices, directing the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the two or more endpoint devices.

Optionally, the computer-implemented method according to the second aspect, further comprising one or more method steps performed by the QKD linking apparatus according to any of the features and/or steps of the first aspect, modifications thereto, combinations thereof and/or as herein described and/or as the application demands.

In a third aspect, the present disclosure provides a system comprising: an QKD linking apparatus according to any of the features and/or steps of the first aspect or second aspects, modifications thereto, combinations thereof and/or as herein described and/or as the application demands; and a plurality of endpoint devices, each endpoint device coupled to the QKD linking apparatus via a QKD link; wherein the QKD linking apparatus is configured to link two or more of the endpoint devices into a QKD network.

In a fourth aspect, the present disclosure provides a computer-readable medium comprising computer code or instructions stored thereon, which when executed on a processor, causes the processor to perform the computer implemented method according to any of the features and/or steps of the first, second and/or third aspects, modifications thereto, combinations thereof, herein described and/or as the application demands.

In a fifth aspect, the present disclosure provides system as herein described with reference to the accompanying drawings.

In a sixth aspect, the present disclosure provides method as herein described with reference to the accompanying drawings.

In a seventh aspect, the present disclosure provides a quantum key distribution linking apparatus as herein described with reference to the accompanying drawings.

In an eighth aspect, the present disclosure provides an endpoint device and/or a method/process performed by an endpoint device as herein described with reference to the accompanying drawings.

In a ninth aspect, the present disclosure provides computer program product as herein described with reference to the accompanying drawings.

The methods and/or process(es) described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, byway of example, with reference to the following drawings, in which.

Figure 1A:
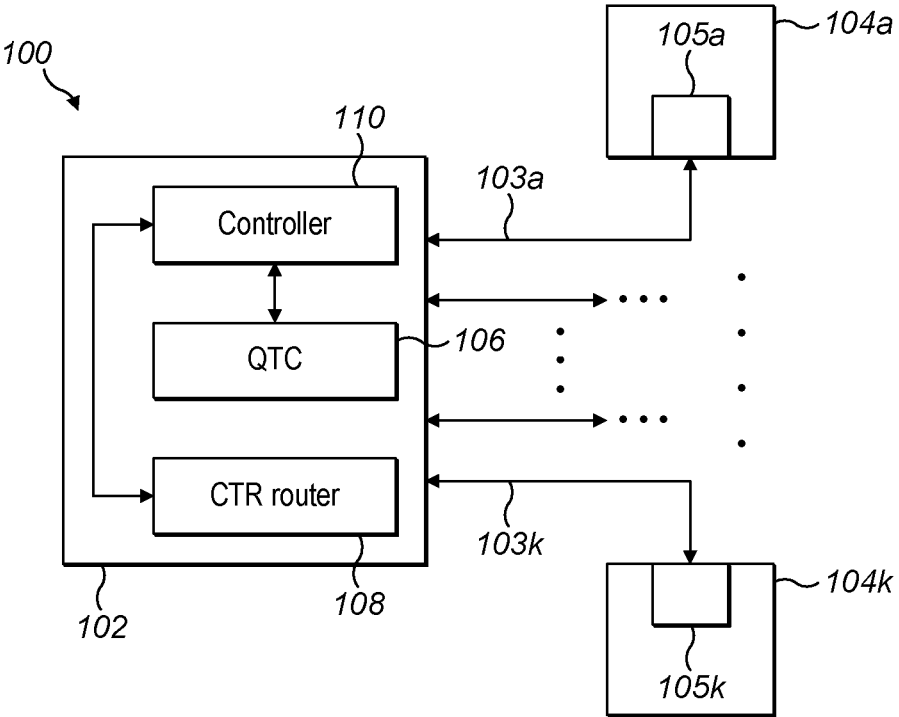
FIG. 1a is a schematic diagram illustrating an example QKD switching system according to some embodiments of the invention.

Common reference numerals are used throughout the figures to indicate similar features.

DETAILED DESCRIPTION

Embodiments of the present invention are described below byway of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present invention provides a quantum key distributed (QKD) linking apparatus for providing QKD communication links (or QKD links) and controlling data flow over the QKD communication links to a plurality of endpoints for use in creating a QKD communication network (or quantum network/cloud) between multiple endpoints. The QKD linking apparatus provides a QKD link to each endpoint of the plurality of endpoints and is configured to allow any endpoint to exchange quantum-encoded signals with any other endpoint via their corresponding QKD link. Each QKD link may include a communications channel include at least a quantum channel and a classical channel that may share the same communication medium. Two or more QKD links may also be configured to share the same communication medium. Thus, many thousands of endpoints may be supported, and the connection cost may be kept relatively low by selecting an appropriate communication medium/media or a communication medium commonly used by these endpoints (e.g. optical fibre links) that may be configured to form each QKD link to each endpoint. For example, the communication medium/media may be based on one or more optical fibres that may be configured for forming each of the QKD links and/or any other suitable communication medium/media that may be rolled out and used by said endpoints in future.

The QKD linking apparatus is also configured to implement one or more QKD protocols for securely exchanging keys in a quantum-secure fashion (e.g. QKD keys) between endpoints via their corresponding QKD links. Given each QKD link has a quantum channel and classical channel and the QKD linking apparatus is used to implement one or more QKD protocols for securely exchanging keys, depending on the QKD protocol (e.g. one or more protocols from the BB84 family of QKD protocols), only limited trust is required from the endpoint devices and QKD linking apparatus, which makes it feasible to deploy this technology in roadside cabinets (with limited physical protection) as well as in switching centres and/or telecommunications exchanges. Thus, thousands of endpoints may be supported with quantum-secure communications at relatively lost cost. As an option, it may also be unnecessary to provide individual communication channels/mediums (e.g. optical fibres or wireless optical links) from endpoints to a central location, rather each communication channel/medium (e.g. optical fibre or optical link) from endpoints may be shared and/or run to a roadside cabinet, which allows costs to be reduced and bandwidth to be shared. This may therefore be deployed as a "last-mile" solution, to connect endpoints of, without limitation, for example offices and homes into a QKD network (or quantum-safe or quantum cloud network).

A quantum communication channel may comprise or represent a communication channel capable of transmitting and/or receiving at least quantum information over a communication medium. Quantum information may include information encoded in one or more quantum states of a quantum system, where a quantum state may be a superposition of other quantum states. Examples of a quantum communication channel or quantum channel that may be used according to the invention may include or be based on, without limitation, for example on one or more types of quantum communication channels associated with the group of: optical quantum communications; free-space optical quantum communications; optical fibre quantum communications; optical fibre communications; free-space optical communications; optical laser quantum communications; communications using electromagnetic waves such as, without limitation, for example radio, microwave, near-infra red, infra-red, gigahertz, terahertz and/or any other type of electromagnetic wave communications; communications based on electron spin and the like; any other type of quantum communications for transmitting and receiving data over a quantum communication channel between devices. It is noted that the communication medium of one or more types of quantum communication channel(s) may also be capable of transmitting and/or receiving non-quantum or classical information.

A standard, classical or non-quantum communication channel(s) may comprise or represent any communication channel between two devices or apparatus that at least is capable of transmitting and/or receiving classical or non-quantum information over a communication medium. Classical of non-quantum information may include information encoded as a non-quantum state. Examples of standard, classical and/or non-quantum communication channels according to the invention may include or be based on, without limitation, for example on one or more types of communication channels from the group of: any one or more physical communication channel(s); optical communication channel; free-space optical communication channel; wireless communication channel; wired communication channel; radio communication channel; microwave communication channel; satellite communication channel; terrestrial communication channel; optical fibre communication channel; optical laser communication channel; telecommunications channels; 2G, 3G, 4G, 5G, and/or 6G and beyond telecommunications channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channel(s) for transmitting data between devices; and/or two or more optical, wireless and/or wired communication channel(s) that form a composite communication channel for transmitting data between devices; and/or any combination of two or more standard, classical or non-quantum communication channel(s) that form a composite communication channel for transmitting and/or carrying data between devices; combinations thereof, modifications thereto, and/or as described herein and the like and/or as the application demands. It is noted that the communication medium of one or more types of standard, classical or non-quantum communication channel(s) may be capable of also transmitting and/or receiving quantum information.

A key or cryptography key may comprise or represent a symbol string and/or a plurality of symbols, where there may be j bit(s) per symbol, thus the symbol set is represented by $M=2^j$ different symbols, where $j \geq 1$. The symbols of the key may be randomly generated by a random symbol or number generator and may be of a fixed length of L symbols depending on the application and the like. A quantum key distributed (QKD) key may comprise or represent a key that has been distributed or exchanged between one apparatus or device and another apparatus or device based on a QKD protocol/quantum key exchange protocol (e.g. BB84 family of QKD protocols and the like and/or as herein described) using at least a quantum communication channel, or at least a quantum communication channel and one or more non-quantum or classical communication channels.

Each of the keys, QKD keys, cryptographic keys, precursor keys, meeting keys, intermediate keys and the like may comprise or represent symbol strings or sets of symbol strings (e.g. n bit(s) per symbol are represented by $M=2^n$ different symbols, where $n \geq 1$). Processing of the symbol strings may include combining of sets of symbol strings, e.g. a first symbol string may be combined with a second symbol string based on, without limitation, for example one-time-pad encryption/decryption, masking, exclusive OR (XOR) operations on bits when symbols are converted to bits, or extended XOR operations on symbols or obfuscated set of the symbol strings. For example, a key may be combined with another key using an XOR operation and/or extended XOR operation on the bits and/or symbols, respectively, of the key and the other key.

That is, combining a first key (or first set of symbols or first symbol string) with a second key (or second set of symbols or a second symbol string) may be performed using, without limitation, for example: exclusive or (XOR) operations on corresponding symbols of the first and second keys (e.g. converting the symbols of the first and second keys into bit strings and performing bitwise XOR); bitwise XOR operations when the symbols of the first and second keys are bit symbols; extended XOR operations on the corresponding symbols of the first and second keys (e.g. using a mathematically defined extended set of "symbol XOR" operations on symbols that preserve the mathematical properties of bitwise XOR operations); one-time-pad encryption of the set of symbols of the first key and the set of symbols of the second key; and/or any other trapdoor or encryption operation on the set of symbols of the first key and set of symbols of the second key and the like.

A user, endpoint or party device may comprise or represent any device or apparatus under control of a user or party that includes communication components/systems or communication capabilities configured to at least receive data over a quantum communication channel and/or establish one or more non-quantum, standard or classical communication channels with other user, endpoint or party devices, and/or the QKD linking apparatus under control of at least one other user or party for implementing, without limitation, for example quantum key exchange, a QKD protocol, QKD group sharing schemes, and/or secure communications with one or more other party devices or endpoints using a QKD key and the like according to the invention. Examples of a user, endpoint and/or party device according to the invention may include, without limitation, for example a user device, mobile device, smart phone, personal computer, laptop, portable computing device, any communication device, computing device or server and the like; a satellite ground receiving station; satellite optical ground receiving (OGR) station and/or apparatus/components thereof; optical ground receiving (OGR) station and/or apparatus/components thereof; telecommunication apparatus, network apparatus, network nodes, routers; 2G, 3G, 4G, 5G, and/or 6G and beyond telecommunications nodes, masts, radio access network nodes and/or any other network entities and the like; and/or any communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s) and the like.

A QKD linking party apparatus or device may further comprise or represent any device or apparatus, component or system that is adapted to, configured to, includes the capability of: establishing one or more quantum communication channels with one or more other party devices and/or transmitting data over the quantum communication channel with the one or more other party devices and, also, establish one or more non-quantum, standard or classical communication channels with said one or more other party devices for transmitting/receiving data to/from said one or more other party devices for, without limitation, for example implementing or facilitating QKD key exchange/negotiation using a QKD protocol for use in secure communications between said at least two party devices according to the invention. Examples of an linking party apparatus or device as described herein and/or according to the invention may include, without limitation, for example an exchange, a local exchange within a roadside cabinet, a ground station or apparatus/components thereof, a relay station, repeater, telecommunication apparatus, network apparatus, network nodes, routers, and/or any apparatus, communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s) and the like.

A QKD link between an endpoint or party device and the QKD linking apparatus may comprise or represent a communication medium or media including a classical or non-quantum communications channel and a quantum communications channel. The configuration of a QKD link and hence the quantum and classical communications channels of the QKD link may depend on the types of QKD protocol(s) or key exchange protocols that may be implemented and performed between the QKD linking apparatus and one or more endpoint devices. For example, a QKD link may include, by way of example only but is not limited to, a bi-directional classical communications channel for transmitting data between the QKD link apparatus and the endpoint and at least a unidirectional quantum communication channel for quantum transmissions from the QKD link apparatus to the endpoint. This configuration of a QKD link may be suitable for QKD protocols (e.g. BB84 family of QKD protocols and the like) in which the endpoint device or one of the endpoint devices is configured to receive quantum information over a quantum channel from the QKD linking apparatus, where the endpoint device(s) are configured to perform bidirectional classical communications over one or more classical channel(s) of their QKD links.

Alternatively or additionally, as an option, a QKD link may be configured to include, by way of example only but is not limited to, a bi-directional classical communications channel for transmitting data between the QKD link apparatus and the endpoint and at least a bidirectional quantum communication channel for quantum transmissions between the link apparatus and the endpoint. This configuration of a QKD link may be suitable for QKD protocols (e.g. BB84 family of QKD protocols and the like) in which the endpoint device or one of the endpoint devices is configured to transmit quantum information over a quantum channel to the QKD linking apparatus, and where the endpoint device(s)

are configured to perform bidirectional classical communications over one or more classical channel(s) of their QKD links.

Alternatively or additionally, there may be a mixture of QKD links supported by the QKD linking apparatus, where a QKD link for a first endpoint device only supports a unidirectional quantum channel used by QKD linking apparatus to transmit quantum information to the first endpoint device, and where a QKD link for a second endpoint device supports a unidirectional quantum channel used by the second endpoint device to transmit quantum information to the QKD linking apparatus, where both QKD links have bidirectional classical communication channels and the like. Thus, a QKD protocol that uses these types of QKD links may be implemented, where the QKD linking apparatus is configured to have a quantum receiver for receiving quantum information from the first endpoint device and a quantum transmitter for transmitting quantum information to the second endpoint and the like.

Alternatively or additionally, as another option, a QKD link for an endpoint device may include, by way of example only but is not limited to, a bi-directional classical communications channel for transmitting data between the QKD link apparatus and the endpoint and at least a bidirectional quantum communication channel for communicating quantum transmissions between the endpoint device to the QKD linking apparatus. This configuration of a QKD link may be suitable top enable the endpoint device to implement or perform a range of QKD protocols (e.g. BB84 family of QKD protocols and the like or QKD protocols requiring endpoint devices to transmit and/or receive quantum information) with the QKD linking apparatus and any other compatible endpoint device with suitable QKD link and the like to QKD linking apparatus. Alternatively or additionally, as an option, the QKD link may include, byway of example only but is not limited to, two or more classical communications channels for transmitting data between the link apparatus and the endpoint and a quantum communication channel for quantum transmissions from the link apparatus to the endpoint.

The communication medium used by one QKD link for an endpoint or shared by two or more QKD links may be any type of communication medium or media capable of being configured to form a quantum channel for transmission of quantum information and/or capable of being configured to form one or more classical communication channels for transmission of non-quantum or classical communications. Alternatively of additionally, different communication mediums may be used for the quantum channel and/or classical channel(s) of each QKD link and the like and/or as the application demands. For example, the communication medium may be configured to, without limitation, propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Although the communication medium for non-quantum or classical channels may be implemented in the same communication medium as the quantum channel, the communication medium for non-quantum channel may be implemented based on, without limitation, for example wired and/or wireless non-quantum technologies, and/or as herein described and the like. The communication medium may be, without limitation, for example any type of waveguide for propagating an electromagnetic signal and the like.

For simplicity and byway of example only, the communication medium may be an optical communication medium capable of propagating electromagnetic signals with wavelengths in at least one from the group of: the visible light spectrum, the near-infrared light spectrum, the infra-red light and the like. For simplicity, such an optical communication medium may include, without limitation, for example optical free-space; an optical cable; multi-mode optical fibre; single-mode optical fibre; one or more optical fibres; optical free space; combinations thereof; modifications thereto; as herein described; and the like and/or as the application demands. For example, the optical communication medium may be an optical fibre capable of propagating light in the wavelengths of at least one of the visible light spectrum and/or near-infra red light spectrum and the like.

For example, the QKD link may be configured to use a communication medium, without limitation, for example an optical communication medium that is configured to use one or more optical fibres configured to carry data over the different channels of the QKD link using, without limitation, for example wavelength division multiplexing (WDM) or dense wavelength division multiplexing (DWDM) and the like. The communication medium of a QKD link may be configured to share the quantum channel and non-quantum channels. For example, the communication medium of a QKD link may use a single optical fibre that uses WDM/DWDM to separate the quantum channel and non-quantum or classical channels. Furthermore, the quantum channel may be a bundle of WDM/DWDM channels in which the quantum transmitter for the quantum channel may have number of $N=2^M$ differently polarised lasers (e.g. M>1, for some QKD protocols N=4) for transmitting quantum information, where each laser uses a different wavelength of light over the quantum channel based on WDM/DWDM. Similarly, the bidirectional classical channel may also use WDM/DWDM. For example, the communication medium of a QKD link for an endpoint may use a single optical fibre that uses WDM/DWDM to separate the quantum channel and non-quantum or classical channels.

Alternatively or additionally, as another option, a communication medium may be configured to be shared by two or more QKD links and channel separation techniques used to separate the QKD links, i.e. ensure separation of the corresponding quantum channel(s) and non-quantum/classical channel(s) of each of the QKD links. For example, two or more QKD links may share the same optical communication medium such as for example, the same optical fibre or optical free space. In this case, when sharing the same optical fibre, then WDM/DWDM may be used to separate each quantum channel of each of the two or more QKD links. For example, each of the two or more QKD links may use a quantum transmitter for transmitting quantum information over their respective quantum channel. Thus, when using WDM/DWDM, each quantum transmitter is configured to use a different wavelength to ensure channel separation of each of the quantum channels of the QKD links over the same fibre or the single fibre. Similarly, when sharing the same optical fibre, then WDM/DWDM may also be used to separate each of the non-quantum channel(s)/classical channel(s) of each of the two or more QKD links.

Alternatively or additionally, as a further option, the topology of the QKD links may be formed using any combination of the different quantum and classical channels over any number of optical fibres, which may be shared or separated depending on how the optical fibres are laid in the local loop and also how these are connected and/or laid to each of the premises/end users and the like, with the WDM/DWDM multiplexors passively splitting or combining the quantum/classical signals. Furthermore, type of sharing and/or WDM/DWDM techniques used may be based on what type of QKD protocols are used and whether these use time-bins and/or phase adds more options.

Alternatively or additionally, as an option, in another example, a QKD link may use a single optical fibre for each channel of the QKD link, where a first optical fibre is used for the quantum channel, a second optical fibre is used for a bidirectional classical or non-quantum channel and the like. The second optical fibre may use WDM/DWDM to separate the transmission paths between linking apparatus and endpoint of the bidirectional classical or non-quantum channels. Additionally or alternatively, as an option, a single optical fibre may be used on transmit and receive paths of the bidirectional classical or non-quantum channel, so the second optical fibre of the QKD link may be used as a unidirectional classical or non-quantum channel and a third optical fibre may be used as another unidirectional classical or non-quantum channel to ensure bidirectional communications over the classical non-quantum channel(s) between the QKD linking apparatus and an endpoint device assigned/allocated to the QKD link.

FIG. 1a is a schematic diagram illustrating an example QKD switching system 100 including a QKD linking apparatus 102 configured for enabling secure communications between two or more endpoint devices (or parties) 104a-104k using QKD protocols and the like. The QKD system 100 includes the QKD linking apparatus 102 and a plurality of endpoint devices (or party devices) 104a-104k that are each connected to the QKD linking apparatus 102 over an assigned or allocated QKD link of the plurality of QKD links 103a-103k. That is, each endpoint device 104a of the plurality of endpoint devices 104a-104k is connected to the QKD linking apparatus 102 by a corresponding QKD link 103a of the plurality of QKD links 103a-103k. The QKD link apparatus 102 may have a mapping of which QKD link of the plurality of QKD links 103a-103k is assigned to each endpoint device of the plurality of endpoint devices 104a-104k. The QKD switching system 100 may be based on a hub-and-spoke model that is configured to connect the QKD linking apparatus 102 (e.g. a central linking party) to multiple endpoint devices 104a-104k controlled by corresponding endpoint parties through the corresponding multiple QKD links 103a-103k.

Each QKD link 103a of the plurality of QKD links 103a-103k is configured to perform conventional or classical communications and also quantum communications over the same communication medium. The communication medium for a QKD link 103a is configured to include a classical communications channel and a quantum communications channel. Thus, each QKD link 103a may shares the same communication medium (e.g. optical communications, one or more optical fibres) with conventional or classical communications and quantum communications (e.g. optical communications, one or more optical fibres). In a preferred embodiment, each QKD link of the plurality of QKD links 103a-103k are configured to be shared with conventional or classical optical communications.

The quantum channel of each QKD link 103a includes a QKD communications channel that may be configured to use non-entangled QKD in which the QKD communications channel includes, without limitation, for example at least a bi-directional classical communications channel (C-channel) and at least a unidirectional quantum communication channel (a Q-channel). Non-entangled QKD uses techniques other than quantum entanglement such as, without limitation for example quantum super-positioning techniques for transmitting quantum information as quantum states over a quantum channel. As an option, the communication medium of each QKD link is the same and is shared by the Q-channel and C-channel. For example, the communication medium of each QKD link may include at least one optical fibre in which the Q-channel and C-channel of the QKD link carry corresponding quantum and classical optical communications signals over the at least one optical fibre. For example, the QKD link may be a single optical fibre in which the Q-channel and C-channel are shared on the same optical fibre. In another example, for added convenience or reliability, the QKD link may be at least two optical fibres, where a first optical fibre of the QKD link is used as the Q-channel and the second optical fibre of the QKD link is used as the C-channel of the QKD link. In a further example, the QKD link may be at least three optical fibres, where a first optical fibre of the QKD link is used as the Q-channel with a bidirectional C-channel being formed with a second and third optical fibre, in which each second and third optical fibres are used to provide a unidirectional C-channel in opposite directions.

Although non-entangled QKD has been described, this is for simplicity and by way of example only and the invention may not be so limited, it is to be appreciated by the skilled person that other types of QKD may be applicable such as, without limitation, for example entangled QKD, which may require further modifications to the Q-TX(s) in which each Q-TX may require two output channels and the endpoints may each be further modified to require two quantum receivers. Alternatively, the quantum channel of a QKD link may be reversed and/or bidirectional in which non-entangled QKD and entangled QKD may be employed by the quantum transmitters or Q-TX(s) and/or quantum receivers used at either the QKD linking apparatus and/or at the endpoint device and the like depending on the QKD protocol that is to be implemented, as described herein and/or as the application demands.

As described, the QKD linking apparatus 102 includes a quantum transmission component (QTC) 106, a classical transceiver router component (CTRC) 108, and a QKD linking controller 112. The quantum transmission component (QTC) 106 is communicatively coupled to the Q-channels of each of the QKD links 103a-103k. The classical transceiver router component (CTRC) 108 is also communicatively coupled to each of the bidirectional classical or non-quantum channel(s) (C-channel(s)) corresponding to each of the QKD links. The QTC 106 is configured to ensure that quantum information associated with an endpoint 104a of the plurality of endpoints 104a-104k is transmitted over the Q-channel of the QKD link 103a for that endpoint 104a. The QTC 106 may have a plurality of quantum transmitters, each quantum transmitter assigned to a different one of the QKD links 103a-103k, where said each quantum transmitter is coupled to the Q-channel of the corresponding QKD link 103a. For example, the Q-channel of a QKD link 103a may be implemented using an optical fibre an optical fibre coupled at one end to a quantum transmitter in the QTC 106 and coupled at the other end to a quantum receiver in the endpoint device 104a. The classical transceiver router component (CTRC) 108 is also communicatively coupled to each of the bidirectional classical or non-quantum channel(s) (C-channel(s)) corresponding to each of the QKD links. For example, the CTRC 108 may have a plurality of classical transceivers, each classical transceiver is assigned to a different one of the QKD links 103a-103k, where said each classical transceiver is coupled to a bidirectional C-channel of the corresponding QKD link 103*a*. For example, each bidirectional C-channel of a QKD link 103*a* may be implemented using, without limitation, for example an optical fibre coupled at one end to a classical optical transceiver of the CTRC 108 and coupled at the other end to a classical optical transceiver of the endpoint device. The controller 110 of the QKD linking apparatus 102 is coupled to the QTC 106 and CTRC 108 for controlling/directing and/or sharing the resources of the QTC 106 and/or CTRC 108 for ensuring the secure flow, transmission and/or routing of information over the required Q-channels and C-channels of each QKD link connecting the QKD linking apparatus to the corresponding endpoint devices accordingly.

In addition, each of the endpoint devices 104*a*-104*k* are communicatively coupled to the QTC 106 and CTRC 108 via corresponding QKD links 103*a*-103*k*. This may be via direct optical fibres and/or using optical multiplexor/demultiplexor(s) at the QTC 106 and CTRC 108 and/or endpoints 104*a*-104*k*. The controller 110 communicates with the QTC 106 to select the appropriate Q-channel of a QKD link 103*a* connecting the corresponding endpoint device 104*a* for transmitting quantum information associated with the endpoint device 104*a* over said Q-channel. Similarly, the controller 110 communicates with the CTRC 108 to perform various operations such as, without limitation, for example: a) selecting the appropriate C-channel of a QKD link 103*a* connecting the corresponding endpoint device 104*a* for transmitting classical information associated with the endpoint device 104*a* over the C-channel; b) selecting the appropriate C-channel of a QKD link 103*a* connecting the corresponding endpoint device 104*a* for transmitting classical information from the QKD linking apparatus to the associated endpoint device 104*a*; c) receiving a classical data transmission addressed to the QKD linking apparatus 102 on a C-channel of a QKD link 103*a* connected to an endpoint device 104*a*; d) receiving a classical data transmission on a C-channel over a QKD link 103*a* connected to an endpoint device 104*a*, where the classical data transmission is addressed to or meant for one or more other endpoint devices 104*b*-104*c*, and selecting the appropriate C-channel(s) of one or more other QKD links 103*b*-103*c* associated with the one or more other endpoint devices 104*b*-104*c* for routing said received classical data transmission over the selected C-channels of the other QKD links 103*b*-103*c* to said other endpoint devices 104*b*-104*c*, and vice versa. The controller 112 may be further configured to control the QTC 106 and CTRC 108 for enabling two or more of the endpoint devices 104*a*-104*k* to perform a QKD protocol for exchanging keys in a quantum-safe or quantum-secure manner and the like in which the QKD linking apparatus 102 may be the intermediary party in the QKD protocol. In addition, after key exchange between the two or more endpoint devices, the controller 112 is further configured to control the QTC 106 and CTRC 108 for providing the necessary routing over the C-channels of the corresponding QKD links that enable the two or more of the endpoint devices 104*a*-104*k* to securely communicate over their corresponding C-channel(s), where each C-channel is encrypted or secured by the exchanged key(s).

For example, during key exchange between two or more endpoint devices, the controller 110 is configured to perform a QKD key exchange protocol and selects/routes quantum information over the Q-channel and/or classical information over the C-channel(s) of each QKD link connected to each of the two or more endpoint devices at the appropriate times during the QKD key exchange protocol to ensure keys are securely exchanged between the two or more endpoint devices. In particular, depending on the QKD key exchange protocol that is to be implemented by the QKD linking apparatus and/or the endpoint devices, the QKD key exchange protocol may be configured to ensure that the QKD linking apparatus is unable to derive the keys agreed between the two or more endpoint devices. Thus, the endpoint devices 104*a*-104*k* are able to form a quantum-secure network with each other for secure communications therebetween using the QKD linking apparatus to route the encrypted classical information over the C-channel of each of the corresponding QKD links 103*a*-103*k* connected to each of the endpoint devices 104*a*-104*k*.

In another example, for a group of two or more endpoint devices 104*a*-104*k*, the controller 110 may be further configured to perform steps during the QKD protocol for exchanging keys such as, without limitation, for example generating a different QKD key for each of the endpoint devices 104*a*-104*k*. This may be performed by the QTC 106 which may include one or more random number generators capable of generating QKD keys, and/or retrieving a QKD key from a set of QKD keys securely stored therein. During generation of each QKD key for each of the endpoint devices 104*a*-104*k* or when each QKD key is retrieved for each of the endpoint devices 104*a*-104*k*, the controller 110 may be configured to direct the QTC 106 to select the required QKD link 103*a* of each endpoint device 104*a* and transmit the QKD key for use by that endpoint device 104*a* as a quantum transmission over the corresponding Q-channel of the selected QKD link 103*a* to that required endpoint device 104*a*. Thus, at certain points during performance of the QKD protocol, the controller 110 selects the appropriate Q-channel of a QKD link 103*a* to transmit the corresponding generated QKD key to the required endpoint device 104*a*, which is received by the required endpoint device 104*a* during performance of the QKD protocol. Thus, the QKD linking apparatus 102 (e.g. central linking party) may transmit, according to the QKD protocol, corresponding randomly generated QKD keys over each Q-channel to corresponding endpoint devices.

In operation, a QKD switching process may be performed by the QKD controller 110 of the QKD linking apparatus 102. The QKD switching process may be configured to perform, without limitation, for example: a) routing generated random keys or retrieved QKD keys from QKD key storage and the like to the correct endpoint device during performance of a QKD protocol between two or more endpoint devices 104*a*-104*k*, where the QKD protocol is configured for exchanging, without limitation, for example QKD keys and/or group QKD keys between said two or more endpoints 104*a*-104*k*; b) when required, during performance of the QKD protocol, switching, selecting, routing and/or connecting the appropriate Q-channel(s) of one or more QKD links 103*a*-103*k* connected to corresponding endpoint devices 104*a*-104*k* to ensure each of the endpoint devices 104*a*-104*k* receives their required quantum transmissions during performance of the QKD protocol; c) switching, selecting, routing and/or connecting the appropriate C-channel(s) of one or more QKD links 103*a*-103*k* connected to corresponding endpoint devices 104*a*-104*k* to ensure each of the endpoint devices 104*a*-104*k* receives their required classical transmissions over their C-channel during performance of the QKD protocol; and/or d) for routing communications between the C-channels of each of the QKD links 103*a*-103*k* of said two or more endpoints 104*a*-104*k* when required during the performance of the QKD protocol(s) and/or thereafter for routing the corresponding C-channels of said QKD links 103*a*-103*k* to enable the at least two endpoints 104a-104k to securely communicate with each other using, without limitation, for example the corresponding exchanged QKD keys and/or group QKD keys and the like as a result of performing said QKD protocol(s) therebetween.

The QKD switching system 100 with QKD linking apparatus 102 provides a means of creating a QKD network between multiple end-points 104a-104k, allowing any end-point to exchange quantum-encoded signals with any other end-point. Many thousands of end-points may be supported, and the connection cost is relatively low and may use optical fibre technologies. Depending on the QKD protocol(s) used and implemented, only limited trust is required from the endpoint devices 104-104k and/or QKD linking apparatus 102, which makes it feasible to deploy the QKD linking apparatus 102 and associated technology in roadside cabinets (with limited physical protection) as well as in switching centres and/or exchanges. It is also unnecessary to provide individual optical fibres from end-points 104a-104k directly to a central location such as an exchange, rather it can be a "last mile" solution where fibre is rolled out from a roadside cabinet and/or mini-exchange to individual endpoints allowing costs to be reduced and bandwidth to be shared and the like. The roadside cabinet and/or mini-exchange may be connected to the central exchange via optical fibre and use WDM/DWDM to carry communications from/to the endpoint devices and the like In further example applications, the QKD linking apparatus 102 (e.g. central linking party) may be configured to match pairs of keys, then use the key for one end party to encrypt the key for a second end party, and send that encrypted key to the second end party, who will in turn decrypt it to obtain a copy of the first party's key. This therefore results in a shared key. Note other algorithms for key matching may be implemented, such as sending part keys to each party. In a preferred implementation, a QKD protocol such as, without limitation, for example BB84-style protocol from the BB84 protocol family such as, without limitation, the conventional BB84 protocol and/or a modified versions thereof such as a modified BB84 protocol as described in GB Patent Application No. 1916311.2 entitled "Quantum Key Distribution Protocol" filed on 8 Nov. 2019 and incorporated herein by reference, and/or any other type of QKD protocol as the application demands may be used to exchange and/or transmit the quantum encoded keys and to link the pairs of keys using the Q-channels and/or C-channels of the QKD links 103a-103k connected with the corresponding endpoint devices 104a-104k. For example, the modified version of the BB84 protocol may be configured such that the intermediary device/sender device, which may be the QKD linking apparatus 102 or any other apparatus/endpoint device with quantum transmission capabilities, and the like does not have knowledge of the final agreed key between receiver/endpoint devices. This means that the QKD linking apparatus 102 (which may be used as intermediary device or sender device as described with reference to BB84) and corresponding central linking party will not have any knowledge of the final agreed key, thereby reducing the level of trust in that the QKD linking apparatus 102 and the central party may require by the parties controlling the endpoint devices 104a-104k.

The QKD switching system 100 may therefore be deployed, without limitation, for example as a "last-mile" solution, to connect offices and homes into a QKD network. In preferred embodiments, the communication medium of each QKD link 103a is the same and is shared by the Q-channel and C-channel of the QKD link. For example, the communication medium of each QKD link 103a may include at least one optical fibre in which the Q-channel and C-channel of the QKD link carry corresponding quantum and classical optical communications signals over the at least one optical fibre. For example, the QKD link 103a may be a single optical fibre in which the Q-channel and C-channel are shared on the same optical fibre. In another example, for added security, the QKD link 103a may be at least two optical fibres, where a first optical fibre of the QKD link is used as the Q-channel and the second optical fibre of the QKD link 103a is used as the C-channel of the QKD link 103a.

Although each of the QKD links 103a-103k of FIG. 1a has been described as having a communication medium based on an optical communication medium such as an optical fibre and the like, this is for simplicity and byway of example only and the invention is not so limited, it is to be appreciated by the skilled person that one or more of the QKD links 103a-103k may be further modified and/or implemented using any other suitable communication medium that is capable of propagating and/or transmitting quantum information over the quantum channel of the corresponding QKD link such as, without limitation, for example propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Alternatively of additionally, different communication mediums may be used for the quantum channel and/or classical channel(s) of each QKD link and the like.

Although the QTC component 106 of QKD linking apparatus 102 of FIG. 1a has been described as including a plurality of quantum transmitters for enabling quantum transmission over a quantum channel of a QKD link 103a of an endpoint device 104a, the QTC component 106 may be further modified to include one or more quantum receivers in which one or more of the QKD links 103a-103k may each be configured to include a unidirectional or bidirectional quantum channel that couples with said one or more quantum receivers for receiving quantum transmissions from the endpoint to the QKD linking apparatus 102. As previously described, this will enable additional QKD protocols requiring an endpoint to transmit quantum information to the QKD linking apparatus to be implemented by the QKD linking apparatus and corresponding endpoint(s), where each endpoint 104a may include a quantum transmitter for transmitting quantum information over a quantum channel of the QKD link 103a to the QKD linking apparatus during operation of said additional QKD protocol and the like, and/or as the application demands.

Figure 1B:
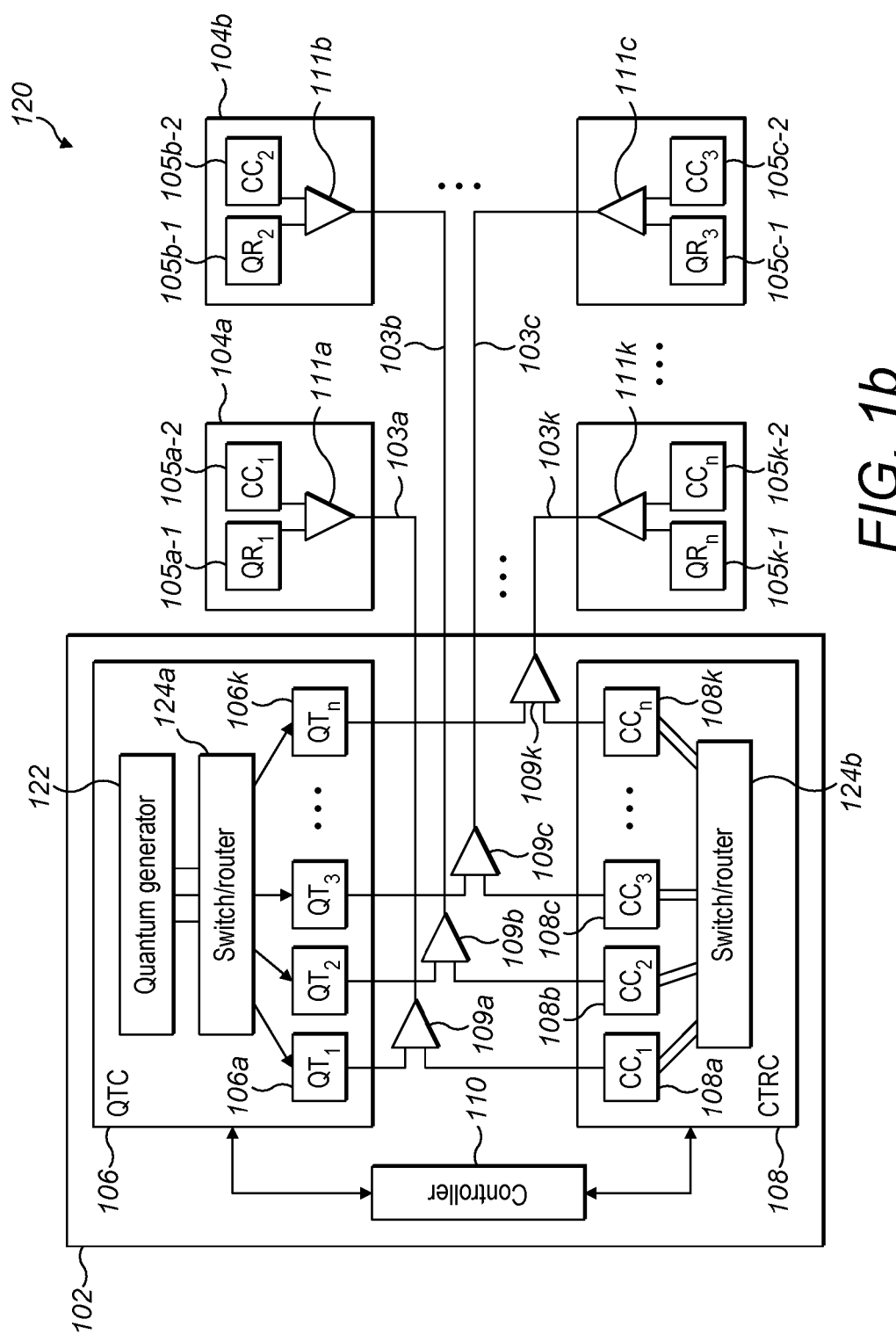
FIG. 1b is a schematic diagram illustrating another example QKD switching system according to some embodiments of the invention.

FIG. 1b is a schematic diagram illustrating another example QKD switching system 120 with QKD linking apparatus 102 according to the invention. For simplicity, reference numerals used in FIG. 1a are reused for the same or similar components when describing FIG. 1b. The QKD switching system 120 is based on the QKD switching system 100 as described with reference to FIG. 1a but has been modified to further illustrate an example of coupling of the QKD links 103a-103k from the QTC 106 and CTRC 108 of the QKD linking apparatus 102 to each corresponding endpoint 104a-104k. The QKD linking apparatus 102 has been further modified by including optical multiplexor/demultiplexors 109a-109k that each optically couple the QTC 106 and CTRC 108 to the corresponding Q-channel and C-channel(s) of each of the QKD links 103a-103k of each of the corresponding endpoints 104a-104k. Each QKD link 103a of the plurality of QKD links 103a-103k is allocated and mapped to a single but different endpoint 104a of the plurality of endpoint devices 104a-104k. That is, there is a one-to-one mapping of each of the QKD links 103a-103k to a different endpoint of the plurality of endpoints 104a-104k.

The QTC 106 is further modified to include a plurality of quantum transmitters 106a-106k, each quantum transmitter of the plurality of quantum transmitters (Q-TX(s)) 106a-106 is coupled to a corresponding one of the optical multiplexors 109a-109k. The CTRC 108 also includes a plurality of classical communication transceivers (CTXR(s)) 108a-108k, in which each of the CTXR(s) 108a-108k are communicatively coupled to a corresponding one of the optical multiplexors 109a-109k. In this example, the communication medium of each QKD link 103a is an optical communication medium such as an optical fibre (or multiple optical fibres) and the coupling of the optical fibre of each QKD link 103a to the QTC 106 and CTRC 108 of the QKD linking apparatus 102 is implemented using one of the corresponding one of the optical multiplexor/demultiplexors 109a-109k each of which allows multiple communications channels such as the C-channel(s) and Q-channel of the QKD link 103a to share the same optical fibre. Similarly, each endpoint device 104a of the plurality of endpoint devices 104a-104k includes a quantum receiver (Q-RX) 105a-1 and a classical transceiver (CTXR) 105a-2, which are coupled to a corresponding optical multiplexor/demultiplexor 111a. Thus, the optical fibre of the QKD link 103a associated with endpoint device 104a is optically coupled at one end to the optical multiplexor/demultiplexor 109a of the QKD linking apparatus 102 and optically coupled at the other end to the optical multiplexor/demultiplexor 111a of the endpoint device 104a. The Q-TX 106a of the QTC 106 and Q-RX 105a-1 of the endpoint device 104a are used to form the Q-channel over the optical fibre of the QKD link 103a for communicating quantum information thereto. As well, the CTXR 108a of the CTRC 108 and CTXR 105a-2 of the endpoint device 104a are used to form the bidirectional C-channel over the optical fibre of the QKD link 103a. For each QKD link 103a of the plurality of QKD links 103a-103k, the Q-channel and bidirectional C-channel(s) may be separated using WDM/DWDM techniques and/or hardware.

In this example, several QKD links 103a-103k are illustrated whereby each endpoint device 104a, 104b, 104c and so on to endpoint device 104k are each allocated a Q-TX 106a, 106b, 106c and so on to Q-TX 106k of the QTC 106. Furthermore, each endpoint device 104a, 104b, 104c and so on to endpoint device 104k are each allocated a CTXR 108a, 108b, 108c, and so on to CTXR 106k. Each of the QKD links 103a, 103b, 103c and so on to 103k are each implemented using a separate optical fibre. In this example, the optical fibre of the QKD link 103a associated with endpoint device 104a is optically coupled at one end to an optical multiplexor/demultiplexor 109a, which is also connected to the Q-TX 106a and CTXR 108a allocated to endpoint device 104a. The optical fibre of the QKD link 103a is also optically coupled at the other end to the endpoint device's optical multiplexor/demultiplexor 111a, which is connected to the Q-RX 105a-1 and CTXR 105a-2 of the endpoint device 104a. The Q-TX 106a of the QTC 106 and Q-RX 105a-1 of the endpoint device 104a form the Q-channel over the optical fibre of the QKD link 103a for communicating, when required, quantum information associated with the endpoint device 104a. As well, the CTXR 108a of the CTRC 108 and CTXR 105a-2 of the endpoint device 104a form the bidirectional C-channel over the optical fibre of the QKD link 103a.

In this example, the optical fibre of the QKD link 103b associated with endpoint device 104b is optically coupled at one end to the optical multiplexor/demultiplexor 109b of the QKD linking apparatus 102, which is connected to the Q-TX 106b and CTXR 108b allocated to endpoint device 104b. The optical fibre of the QKD link 103b is also optically coupled at the other end to the optical multiplexor/demultiplexor 111b of the endpoint device 104b, which is connected to the Q-RX 105b-1 and CTXR 105b-2 of the endpoint device 104b. The Q-TX 106b of the QTC 106 and Q-RX 105b-1 of the endpoint device 104b form the Q-channel over the optical fibre of the QKD link 103b for communicating quantum information associated with the endpoint device 104b. As well, the CTXR 108b of the CTRC 108 and CTXR 105b-2 of the endpoint device 104b form the bidirectional C-channel over the optical fibre of the QKD link 103b.

In this example, the optical fibre of the QKD link 103c associated with endpoint device 104c is optically coupled at one end to the optical multiplexor/demultiplexor 109c of the QKD linking apparatus 102, which is connected to the Q-TX 106c and CTXR 108c allocated to endpoint device 104c. The optical fibre of the QKD link 103c is also optically coupled at the other end to the optical multiplexor/demultiplexor 111c of the endpoint device 104c, which is connected to the Q-RX 105c-1 and CTXR 105c-2 of the endpoint device 104c. The Q-TX 106c of the QTC 106 and Q-RX 105c-1 of the endpoint device 104c form the Q-channel over the optical fibre of the QKD link 103c for communicating quantum information associated with the endpoint device 104c. As well, the CTXR 108c of the CTRC 108 and CTXR 105c-2 of the endpoint device 104c form the bidirectional C-channel over the optical fibre of the QKD link 103c.

In this example, the optical fibre of the QKD link 103k associated with endpoint device 104k is optically coupled at one end to the optical multiplexor/demultiplexor 109k of the QKD linking apparatus 102, which is connected to the Q-TX 106k and CTXR 108k allocated to endpoint device 104k. The optical fibre of the QKD link 103k is also optically coupled at the other end to the optical multiplexor/demultiplexor 111k of the endpoint device 104k, which is connected to the Q-RX 105k-1 and CTXR 105k-2 of the endpoint device 104k. The Q-TX 106k of the QTC 106 and Q-RX 105k-1 of the endpoint device 104k form the Q-channel over the optical fibre of the QKD link 103k for communicating quantum information associated with the endpoint device 104k. As well, the CTXR 108k of the CTRC 108 and CTXR 105k-2 of the endpoint device 104k form the bidirectional C-channel over the optical fibre of the QKD link 103k.

Each of the endpoint devices 104a-104k have been allocated a different QKD link of the plurality of QKD links 103a-103k. Once each of the endpoint devices 104a-104k is connected to the QKD linking apparatus 102 via the QKD links 103a-103k, each endpoint devices may wish to form or join a quantum network and/or perform quantum-secure communications therebetween with one or more other endpoint devices 104a-104k and the like. In order to do this, the C-channel of the QKD links 103a-103c of those two or more endpoint devices 104a-104c need to be secured with a QKD key or quantum-safe key. Thus, the controller 110 of the QKD linking apparatus 102 may be configured to perform a QKD key exchange protocol involving the two or more endpoint devices 104a-104c that wish to join and/or form a quantum network and/or securely communicate with each other and the like. The controller 110, when performing the QKD protocol, may instruct the QTC 106 to generate quantum random numbers or bits (or a QKD key) from a quantum generator 122 (or random number generator) for each of the two or more endpoint devices 104a-104c, where the quantum bits generated for each endpoint device 104a is required to be transmitted as quantum information to that endpoint device 104a. Furthermore, during performance of the QKD protocol, the controller 110 may be required to generate classical data or bits for classical transmission to and/or route any received classical transmissions from the QKD links 103a-103c of the one or more other endpoint devices 104a-104c to other endpoint devices 104a-104c, where the generated classical data or bits and/or received classical transmissions are required to be sent over the correct C-channel of the QKD link connected to the endpoint device requiring reception of these classical transmission(s).

In order to do this, the controller 110 may look-up the one-to-one mappings of the Q-TXs 106a-106c that has been assigned to each of the two or more endpoint devices 104a-104c and also look-up the one-to-one mappings of the CTRXs 108a-108c assigned to each of the two or more endpoint devices 104a-104c. Thus, during the QKD protocol, the controller 110 is configured to communicate the Q-TX 106a and CTRX 108a used on the QKD link 103a of endpoint device 104a to the QTC 106 so QTC 106 may select the required Q-TX 106a and/or the required CTXR 108a for use with the corresponding Q-channel and/or C-channel, respectively, of the QKD link 103a of the endpoint device 103a that required to receive the quantum transmission or classical transmission. For example, when performing the QKD protocol, the controller 110 may instruct the QTC 106 to generate quantum random numbers or bits (or a QKD key) from the quantum generator 122 (or random number generator) for each of the two or more endpoint devices 104a-104c, and so for each endpoint device 104a of the two or more endpoint devices 104a-104c the controller 110 selects the Q-TX 106a and CTXR 108a coupled to the QKD link 103a of said each endpoint device 103a and directs the quantum generator 122 to connect, using the switching/routing module 124a, to the selected Q-TX 106a coupled to the Q-channel of the QKD link 103a of said endpoint 104a and thus enable quantum transmission of the quantum bits generated for the endpoint device 104a by the quantum generator 122 as part of the QKD protocol and the like. In another example, when performing the QKD protocol, the controller 110 may be required to generate classical data for classical transmission and/or route classical data received by CTRXs 108b-108c assigned to other endpoint devices 104b and 104c that are meant for classical transmission to endpoint device 104a. The controller 110 may instruct the CTRC 108 to route the classical data and/or received classical transmissions to the required endpoint device 104 by selecting the CTXR 108a coupled to the QKD link 103a of said endpoint device 104a requiring the classical transmission(s) and, using the switching/routing module 124b, directs the classical transmissions to the selected CTRX 108a coupled to the C-channel of the QKD link 103a of said endpoint 104a and thus enable classical transmission of the classical data and/or routing of the received classical transmissions to the endpoint device 104a as part of the QKD protocol and the like. The controller 110 may perform this selection of Q-TX(s) and/or CTXR(s) for each of the endpoint devices 104a-104c that are together performing a QKD protocol for exchanging QKD keys and/or group QKD keys and the like according to the QKD protocol.

Furthermore, the controller 110 may be further configured to perform the corresponding QKD protocol steps of generating QKD keys using one or more random number generators 122, and transmitting said generated QKD keys using quantum transmissions to each of the endpoint devices 104a-104c associated with performing the QKD protocol for secure communications therebetween. Thus, at certain points during performance of the QKD protocol, the controller 110 will select the Q-TX(s) 106a of the Q-TX(s) 106a-106k assigned to a particular endpoint 104a of the plurality of endpoints 104a-104k and direct the switching/routing module 122a to direct the quantum transmissions using the selected Q-TX 106a to the corresponding Q-channel of the QKD link 103a associated with the endpoint device 104a requiring the quantum transmissions (e.g. receiving QKD keys and the like) over the corresponding Q-channels during the QKD protocol. Thus, the QKD linking apparatus 102 (e.g. central linking party) may transmit, according to the QKD protocol, corresponding randomly generated QKD keys over each Q-channel to corresponding endpoint devices using the Q-TX(s) assigned/allocated to said endpoint devices. If the QTC 106 has two or more random number generator(s) 122a or the same quantum random bits are required to be sent to multiple endpoints 104a-104c based on steps of the QKD protocol, then the quantum transmissions to each individual device requiring the quantum random bits may be performed simultaneously using the Q-TX assigned to each individual endpoint device. Additionally or alternatively, the QKD linking apparatus 102 (e.g. central linking party) may transmit, according to the QKD protocol, corresponding randomly generated QKD keys over each Q-channel to corresponding endpoint devices in a sequential manner when it is required to transmit to multiple Q-RXs 105a-1 to 105c-1 of corresponding endpoint devices 104a-104c, where the quantum data for quantum transmission is switched to the Q-TX 106a assigned to each endpoint device 104a, using the switching/routing module 122a, for connecting to the corresponding Q-channel of the endpoint device 104a at the appropriate time. One advantage of the QKD linking apparatus 102 for performing its operations sequentially for at least two endpoint devices or a group of endpoint devices when performing a QKD protocol therebetween is that the hardware components such as, without limitation, for example the quantum generator and high-speed processing systems may be minimised as there is no need for all these hardware components to be replicated or duplicated, rather the controller 110 may enable common components such as quantum generator and high-speed processing systems to be shared over or between the QKD links of the at least two endpoint devices and/or the group of devices. This may be achieved by the controller 112 controlling the operation of the QKD protocol by directing, at the required time, the switching/routing module 122a to switch/route an incoming quantum bit stream (e.g. generated/retrieved from a component of the QTC 106 such as, without limitation, for example a shared quantum generator 122 or quantum key storage) from a previous Q-TX 106k to the required Q-TX 106a for quantum transmission of the quantum bit stream onto the correct Q-channel of the QKD link 103a connected to an endpoint device 104a requiring said incoming quantum bit stream. Subsequent incoming quantum bit streams for other endpoint devices 104b-104c may cause the controller 110 to direct the switching/routing module 122a to switch/route the subsequent incoming quantum bit stream to another Q-channel of another QKD link 103b of another endpoint device 104b of the associated at least two devices or group of devices performing the QKD protocol with said endpoint device 104a. Thus, common components of the QKD linking apparatus 102 may be shared over different QKD links 103a-103k by judicious control and use of the switching/routing module 122a. For classical transmissions over the C-channel of each QKD link 103a-103c connected to each of the two or more devices 104a-104c during performance of the QKD protocol when exchanging keys and/or thereafter for subsequent secure communications between the two or more endpoint devices 104a-104c that are secured using the exchanged keys, the controller 110 may be configured to direct the switching/routing module 122b of the CTRC 108 to perform, at the required times during the QKD protocol and/or in subsequent communications, packet switching to "switch/route" classical transmission messages between the different classical transmitters/receivers 105a-2 to 105c-2 of said endpoint devices 104a-104c. The QKD controller 110 may be further configured to perform, without limitation, for example switching/routing and/or connecting classical transceivers (C-TRX(s)) 108a-108k to the appropriate classical communication channels (C-channels) of the corresponding QKD links 103a-103k of two or more endpoints 104a-104k when required during performance of one or more QKD protocol(s) for routing classical communications between the C-channels of each of the QKD links 103a-103c of said two or more endpoints 104a-104c when required during the performance of the QKD protocol(s) and/or thereafter for switching/routing the corresponding C-channels of said QKD links 103a-103c to enable the at least two endpoints 104a-104c to securely communicate with each other using, without limitation, for example the corresponding exchanged keys, group keys, QKD keys and/or group QKD keys and the like based on said QKD protocol(s) performed therebetween.

The QKD switching system 120 provides a means of creating a QKD network between multiple end-points 104a-104k, allowing any end-point to exchange quantum-encoded signals with any other end-point. Many thousands of end-points may be supported, and the connection cost is relatively low. Depending on the QKD protocol(s) used and implemented, only limited trust is required from the QKD devices 104-104k and/or QKD linking apparatus 102, which makes it feasible to deploy the QKD linking apparatus and associated technology in roadside cabinets (with limited physical protection) as well as in switching centres and/or exchanges. It is also unnecessary to provide individual fibres from end-points 104a-104k to a central location such as an exchange, rather it can be a "last mile" solution where fibre is rolled out from a roadside cabinet and/or mini-exchange to individual endpoints allowing costs to be reduced and bandwidth to be shared and the like.

The QKD switching system 120 may therefore be deployed, without limitation, for example as a "last-mile" solution, to connect offices and homes into a QKD network. In preferred embodiments, the communication medium of each QKD link 103a is the same and is shared by the Q-channel and C-channel. For example, the communication medium of each QKD link 103a may include at least one optical fibre in which the Q-channel and C-channel of the QKD link carry corresponding quantum and classical optical communications signals over the at least one optical fibre. For example, the QKD link 103a may be a single optical fibre in which the Q-channel and C-channel are shared on the same optical fibre. In another example, for added security, the QKD link 103a may be at least two optical fibres, where a first optical fibre of the QKD link is used as the Q-channel and the second optical fibre of the QKD link 103a is used as the C-channel of the QKD link 103a.

Although each of the QKD links 103a-103k of FIG. 1b has been described as having a communication medium based on an optical communication medium such as an optical fibre and the like, this is for simplicity and byway of example only and the invention is not so limited, it is to be appreciated by the skilled person that one or more of the QKD links 103a-103k may be further modified and/or implemented using any other suitable communication medium that is capable of propagating and/or transmitting quantum information over the quantum channel of the corresponding QKD link such as, without limitation, for example propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Alternatively of additionally, different communication mediums may be used for the quantum channel and/or classical channel(s) of each QKD link and the like.

Although the QTC component 106 of QKD linking apparatus 102 of FIG. 1b has been described as including a plurality of quantum transmitters or Q-TX(s) 106a-106k for enabling quantum transmission over a quantum channel of one or more QKD links 103a-103k of said endpoint devices 104a-104k, the QTC component 106 may be further modified to include one or more quantum receivers (Q-RX(s)) in which one or more of the QKD links 103a-103k may each be configured to include a unidirectional or bidirectional quantum channel that couples with said one or more Q-RX(s) for receiving quantum transmissions from the corresponding endpoint to the QKD linking apparatus 102. As previously described, this will enable additional QKD protocols requiring an endpoint to transmit quantum information to the QKD linking apparatus 102 to be implemented by the QKD linking apparatus 102 and corresponding endpoint(s), where each endpoint 104a may include a Q-TX for transmitting quantum information over a quantum channel of the QKD link 103a to the QKD linking apparatus 102 during operation of said additional QKD protocol and the like, and/or as the application demands.

Figure 1C:
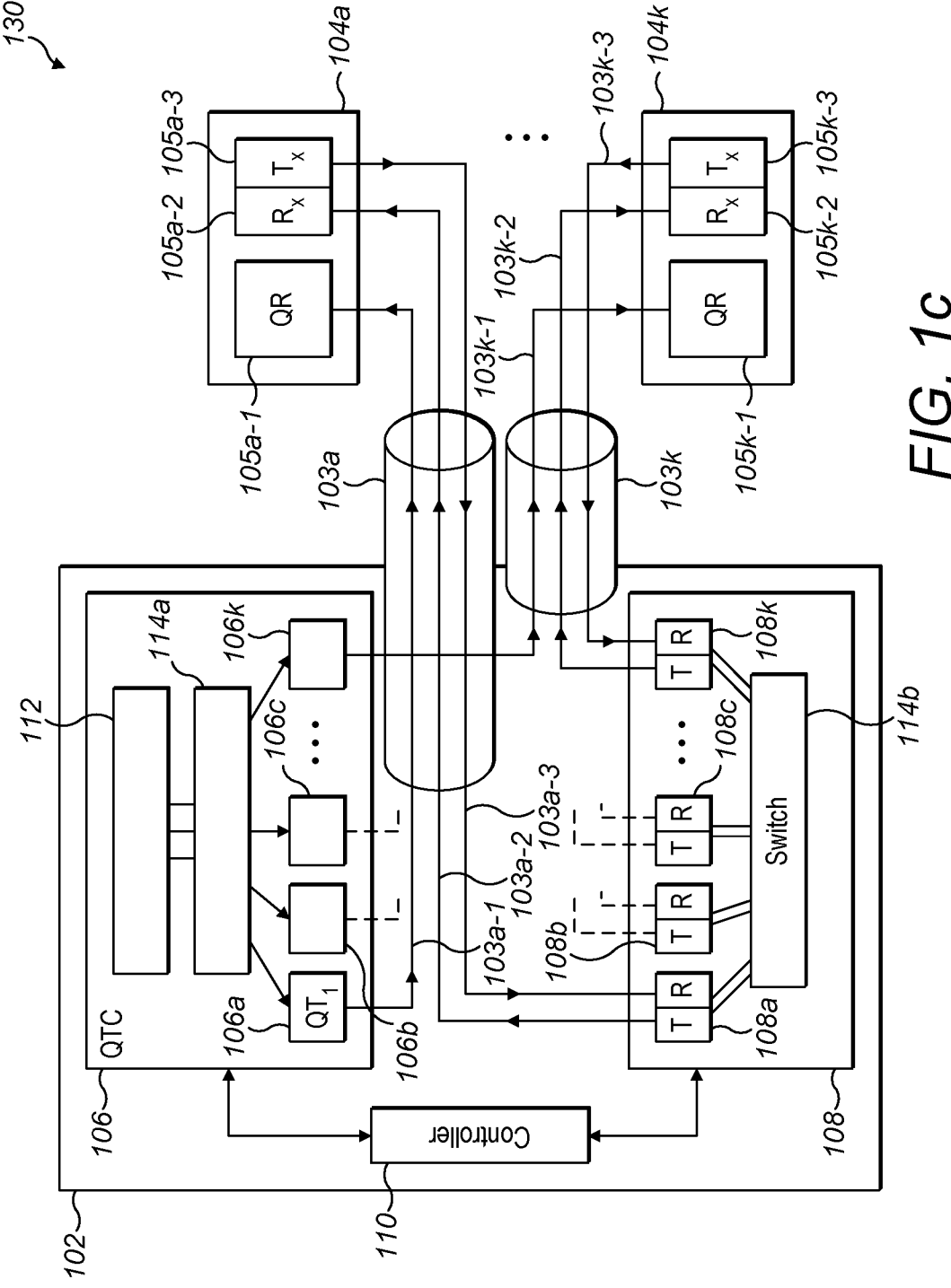
FIG. 1c is a schematic diagram illustrating a further example QKD switching system according to some embodiments of the invention.

FIG. 1c is a schematic diagram illustrating another example QKD switching system 130 with QKD linking apparatus 102 according to the invention. For simplicity, reference numerals used in FIG. 1a or 1b are reused for the same or similar components when describing FIG. 1c. The QKD switching systems 130 is based on the QKD switching system(s) 100 or 120 as described with reference to FIG. 1a but with further modifications in relation to coupling of the QKD links 103a-103k from the QTC 106 and CTRC 108 of the QKD linking apparatus 102 to each corresponding endpoint 104a-104k. Rather than the QKD linking apparatus 102 including optical multiplexors/demultiplexors 109a-109k and/or 111a-111k as described with reference to FIG. 1b, in which an optical fibre is used to share the Q-channel and C-channels of each QKD link, instead, each QKD link 103a uses two or more optical fibres that are each allocated to one of a Q-channel and one or more C-channel(s) of the QKD link 103a. The QTC 106 includes a plurality of Q-TX(s) 106a-106k, in which each of the Q-TX(s) 106a-106 is assigned to corresponding ones of the plurality of endpoint devices 104a-104k. The CTRC 108 includes a plurality of CTXR(s) 108a-108k, in which each of the CTXR(s)

108a-108k is assigned to corresponding ones of the plurality of endpoint devices 104a-104k. In this example, each QKD link 103a that is assigned to each endpoint device 104a of the endpoint devices 104a-104k uses a first, second and third single optical fibre 103a-1, 103a-2 and 103a-3, respectively, for carrying quantum transmissions over a Q-channel and classical transmissions over the bidirectional C-channel (or two unidirectional C-channels). For each QKD link 103a of the plurality of QKD links 103a-103k that is assigned to each endpoint device 103a of the plurality of endpoint devices 103a-103k, the controller 110 also stores a mapping, for each of the endpoint devices 104a-104k, of which Q-TX 106a and CTXR 108a is assigned to each endpoint device 104a for use in connecting to the Q-channel and C-channel(s) of the QKD link 103a. In this example, when QKD link 103a is assigned to endpoint device 103a, then the controller 110 assigns Q-TX 106a and CTRX 108a to the endpoint device 103a, stores this mapping to ensure the controller 110 controls the switching/routing modules 124a and 124b to ensure quantum transmissions and/or classical transmissions addressed to the endpoint device 103a are transmitted to the endpoint device 103a over the Q-channel and/or C-channel(s) of the QKD link 103a assigned to the endpoint device 104a.

In this example, several QKD links 103a-103k are illustrated to be each assigned to a different corresponding endpoint device of the plurality of endpoint devices 104a-104k. Each endpoint device 104a-104k is assigned or allocated one different QTX 106a from the plurality of Q-TX(s) 106a-106k of the QTC 106, and each endpoint device 104a-104k is assigned or allocated one different CTRX 108a from the plurality of CTRX(s) 108a-108k. Each of the QKD links 103a-103k are each implemented using a several optical fibres. In this example, the QKD link 103a uses a first optical fibre 103a-1 is coupled at a first end to the Q-TX 106a assigned to the endpoint device 104a and coupled at a second end to the Q-RX 105a-1 of the endpoint device 104a to form the Q-channel of the QKD link 103a. The QKD link 103a also uses a second optical fibre 103a-2 that is coupled at a first end to the transmitter of the CTRX 108a assigned to the endpoint device 104a and coupled at a second end to the classical receiver 105a-2 of the endpoint device 104a to form a unidirectional C-channel of the QKD link 103a for transmitting classical data or data packets/messages from the CTRC 108 to the endpoint device 104a. The bidirectional C-channel is formed by the QKD link 103a using a third optical fibre 103a-3 that is coupled at a first end to the classical transmitter 105a-3 of the endpoint device 104a and coupled at a second end to the classical receiver of the CTRX 108a assigned to the endpoint device 104a to form a unidirectional C-channel of the QKD link 103a for transmitting classical data or data packets/messages from the endpoint device 104a to the CTRC 108 of the QKD linking apparatus 102. The QKD link 103k assigned to endpoint device 104k uses a first optical fibre 103k-1 that is coupled at a first end to the Q-TX 106k assigned to the endpoint device 104k and coupled at a second end to the Q-RX 105k-1 of the endpoint device 104k to form the Q-channel of the QKD link 103k. The QKD link 103k also uses a second optical fibre 103k-2 that is coupled at a first end to the transmitter of the CTRX 108k assigned to the endpoint device 104k and coupled at a second end to the classical receiver 105k-2 of the endpoint device 104k to form a unidirectional C-channel of the QKD link 103k for transmitting classical data or data packets/messages from the CTRC 108 to the endpoint device 104k. The bidirectional C-channel is formed by the QKD link 103k using a third optical fibre 103k-3 that is coupled at a first end to the classical transmitter 105k-3 of the endpoint device 104k and coupled at a second end to the classical receiver of the CTRX 108k assigned to the endpoint device 104k to form a unidirectional C-channel of the QKD link 103k for transmitting classical data or data packets/messages from the endpoint device 104k to the CTRC 108 of the QKD linking apparatus 102.

Each of the endpoint devices 104a-104k have been allocated a different QKD link from the plurality of QKD links 103a-103k. Once each of the endpoint devices 104a-104k is connected to the QKD linking apparatus 102 via their corresponding QKD links 103a-103k, each endpoint devices may wish to form or join a quantum network and/or perform quantum-secure communications therebetween with one or more other endpoint devices 104a-104k and the like as described with reference to FIGS. 1a to 1b and/or as described herein, modifications thereof, combinations thereto and/or as the application demands.

The QKD switching system 130 also provides a means of creating a QKD network between multiple end-points 104a-104k, allowing any end-point to exchange quantum-encoded signals with any other end-point. Many thousands of end-points may be supported, and the connection cost is relatively low. Depending on the QKD protocol(s) used and implemented, only limited trust is required from the QKD devices 104-104k and/or QKD linking apparatus 102, which makes it feasible to deploy the QKD linking apparatus and associated technology in roadside cabinets (with limited physical protection) as well as in switching centres and/or exchanges. It is also unnecessary to provide individual fibres from end-points 104a-104k to a central location such as an exchange, rather it can be a "last mile" solution where each optical fibre for an endpoint is rolled out from a roadside cabinet and/or mini-exchange to individual endpoints allowing costs to be reduced and bandwidth to be shared and the like. The QKD switching system 130 may therefore be deployed, without limitation, for example as a "last-mile" solution, to connect offices and homes into a QKD network.

Although each of the QKD links 103a-103k of FIG. 1c have been described as having a communication medium based on an optical communication medium such as one or more optical fibres and the like, this is for simplicity and by way of example only and the invention is not so limited, it is to be appreciated by the skilled person that one or more of the QKD links 103a-103k may be further modified and/or implemented using any other suitable communication medium that is capable of propagating and/or transmitting quantum information over the quantum channel of the corresponding QKD link such as, without limitation, for example propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Alternatively of additionally, different communication mediums may be used for the quantum channel and/or classical channel(s) of each QKD link and the like.

Although the QTC component 106 of QKD linking apparatus 102 of FIG. 1c has been described as including a plurality of quantum transmitters or Q-TX(s) 106a-106k for enabling quantum transmission over a quantum channel of one or more QKD links 103a-103k of said endpoint devices 104a-104k, the QTC component 106 may be further modified to include one or more quantum receivers (Q-RX(s)) in which one or more of the QKD links 103a-103k may each be configured to include a unidirectional or bidirectional quantum channel over a fourth optical fibre optically connected to a Q-TX at the endpoint and one of the Q-RX(s) at the QKD linking apparatus 102 for receiving quantum transmissions from the corresponding endpoint over the fourth optical fibre. As previously described, this will enable additional QKD protocols requiring an endpoint to transmit quantum information over the fourth optical fibre to the QKD linking apparatus 102 to be implemented by the QKD linking apparatus 102 and corresponding endpoint(s), where each endpoint 104a includes a Q-TX for transmitting quantum information over a quantum channel of the QKD link 103a to the QKD linking apparatus 102 during operation of said additional QKD protocol and the like, and/or as the application demands.

Figure 1D:
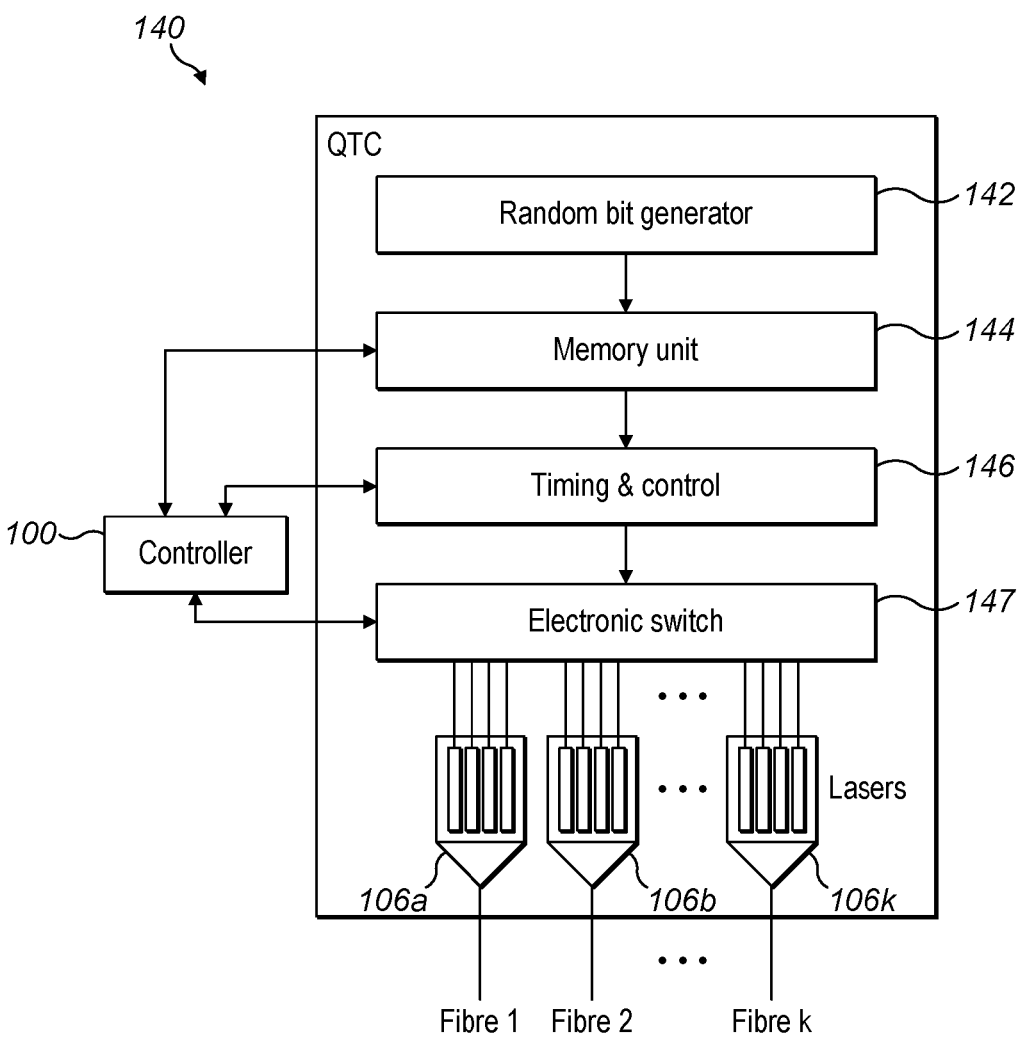
FIG. 1d is a schematic diagram illustrating an example quantum transmission component for use in QKD switching system of FIGS. 1a to 1c, 1e and/or 2 to 5b according to some embodiments of the invention.

FIG. 1d is a schematic diagram illustrating an example quantum transmission component (QTC) 140 for use in QKD switching systems 100, 120, 140 as described with reference to FIGS. 1a to 1c, and/or as herein described, modifications thereto and/or as the application demands. The QTC 140 includes a random bit generator 142 (e.g. quantum generator, quantum or chaotic random bit generator), memory unit, 144, timing and control unit 146, an electronic switch/router 147 and a plurality of quantum transmitters (Q-TXs) 106a-106k. The QTC 140 may also include a controller 110 and/or be connected to a controller 110 for controlling the operation of the random bit generator 142, memory unit 144, timing unit 146 and electronic switch/router 147 based on one or more QKD protocols for exchanging keys between two or more endpoint devices. Each Q-TX 106a may be connected to an endpoint device via an optical fibre that is used to form a quantum channel (Q-channel) of a QKD link assigned to the endpoint device. The Q-TX(s) 106a-106k may each be coupled to an optical fibre for forming a corresponding Q-Channel of a QKD link of the plurality of QKD links. As illustrated in FIG. 1d, the random bit generator 142 is connected to the memory unit 144, the memory unit is connected to the timing and control unit 146 and the timing and control unit is connected to the electronic switch/router 147. The electronic switch/router 147 is connected to each of the plurality of Q-TX(x) 106a-106k and is configured to direct or switch/route one or more quantum random bit streams, which are generated by the random bit generator 142 for use by one or more endpoint devices, to the Q-TXs 106a-106k assigned to the corresponding one or more endpoint devices. In essence, random bits are generated by the random bit generator 142 (e.g. quantum or chaotic random bit generator) and temporarily stored in the memory unit 144. Under command of the controller 110, bits or random bit streams will be read out of the memory 144 and sent, via an electronic switch/router 147, to the Q-TX allocated or assigned to an endpoint device.

Each of the Q-TX(s) 106a-106k include a plurality of differently polarised lasers or optical lasers for transmitting quantum information over the optical fibre of the corresponding Q-Channel. Each Q-TX may include a number of $N=2^M$ differently polarised lasers (e.g. M>1, for some QKD protocols N=4) for transmitting quantum information, each laser is coupled to the optical fibre. In this example, N=4 lasers each having one of 4 different polarisations. For example, the lasers of a Q-TX 106a may be configured to have a rectilinear photon basis (e.g. vertical (0°) and horizontal (90°) polarisations) and diagonal photon basis (e.g. 45° and 135° polarisations). As an option, each quantum channel may be a bundle of WDM/DWDM channels in which each laser of a Q-TX 106a may use a different wavelength of light over the quantum channel based on WDM/DWDM techniques. Essentially, the lasers of a Q-TX 106a are configured for transmitting the quantum signals and sync pulses associated with the quantum random bit stream to the endpoint device assigned to the Q-TX 106a. The endpoint device receiver will receive a few of the transmitted photons, and, depending on the QKD protocol, then use the classical IP-based channel (C-channel) of the QKD link assigned to the endpoint device to talk with controller 110 in accordance with the QKD protocol. Additionally and/or alternatively, as an option, the N=4 lasers of one or more of Q-TXs 106a-106k may be replaced and/or reconfigured for use with other modulation techniques for the same or different QKD protocol and/or implementation of the QKD protocol being used and the like. For example, another modulation technique may include, without limitation, for example the time-bin approach in which a Q-TX 106a may be configured to use beam splitters and interferometers to transmit four possible quantum states (e.g. one or other time bin, or in-phase or anti-phase combination of both bins and the like). Although polarisation and/or time-bin modulation schemes have been described, this is for simplicity and byway of example only and the invention is not so limited, it is to be appreciated by the skilled person that each of the Q-TX(s) may be implemented using any suitable quantum modulation scheme in relation to the communication medium being used for the quantum channel(s) and the like, modifications thereof, combinations thereto and/or as the application demands.

The controller 110 of the QTC 140 may be configured to assign each of the Q-TX(s) 106a-106k to corresponding ones of the plurality of endpoint devices. Each of the Q-TX(s) 106a-106k are assigned to a different endpoint device. The Q-TX 106a that is assigned to an endpoint device is connected to the endpoint device by an optical fibre forming the Q-channel of the QKD link assigned to the endpoint device. For each QKD link of the plurality of QKD links that is assigned to each endpoint device of the plurality of endpoint devices, the controller 110 may store a mapping, for each of the endpoint devices, of which Q-TX 106a is assigned to which endpoint device 104a for use in ensuring a random quantum bit stream generated for the endpoint device is transmitted over the Q-channel of the QKD link assigned to the endpoint device. Each of the endpoint devices are allocated a different QKD link from the plurality of QKD links.

During operation, the QTC 140 and/or under the control of the controller 110 when performing one or more QKD protocol(s) for exchanging keys between two or more endpoint devices, the random bit generator 142 (or quantum generator) may be configured to generate one or more random quantum bit streams, QKD keys and the like for use in transmission over one or more quantum channel(s) (Q-channel(s)) to the corresponding endpoint devices wishing to exchange keys according to the selected QKD protocol and the like. Each of the random quantum bit streams may be stored in a secure memory unit 144 until needed. Each random quantum bit stream may be used as a QKD key or OTP key and the like, hence a set of QKD keys/OTP keys or a set of keys may be stored in the memory unit 144. The memory unit 144 may be a secure memory such as, without limitation, for example a hardware security module (HSM), trusted security component or the like. The timing and control unit 146 may configured based on one or more QKD protocols to retrieve a random quantum bit stream stored in memory unit 144 for transmission over a quantum channel to an endpoint device. The timing and control unit 146 may be controlled by the controller 110, which may indicate which endpoint devices are performing a particular QKD protocol and so ensure the timing and control unit 146 retrieves and sends these endpoint devices the same or different quantum random bit streams (or QKD keys) at the correcting time during performance of the QKD protocol with these endpoint devices. The timing and control unit 146 provides each random quantum bit stream to the electronic switch/router 147, which with the assistance of the controller 110, is configured to direct/route or switch the input or incoming random quantum bit stream associated with an endpoint device to the Q-TX 106a assigned to the endpoint device. Thus, the electronic switch/router 147 is configured to select, from the plurality of Q-TX(s) 106a-106k, the Q-TX 106a assigned to the endpoint device and that is connected to the Q-Channel of the QKD link of the endpoint device that is meant to receive the incoming or received random quantum bit stream during performance of the QKD protocol with the two or more endpoint devices.

For example, the QKD protocol may require, without limitation, for example each endpoint device of two or more endpoint devices performing the QKD protocol to receive a different random set of quantum bits. Thus, a random set of quantum bits for an endpoint device may be retrieved from the memory unit 144 and sent to the electronic switch/router 147, which selects the Q-TX 106a assigned to the endpoint device and directs the incoming retrieved random set of quantum bits to the selected Q-TX 106a in which the lasers are configured to transmit the quantum signals and sync pulses associated with the quantum random bit stream over the Q-channel of the QKD link of the endpoint device. The endpoint device Q-RX may receive some of the transmitted photons, and, then use a classical IP-based channel (C-channel) of the QKD link of the endpoint device to indicate to the controller 110 which photons were received and the like. The controller 110 of the QTC 106 can discard away all other data associated with the quantum transmission of the retrieved random bit stream, and send its basis in relation to those random bits successfully by the Q-RX of the endpoint device. The retrieval and quantum transmission of another random quantum bit stream is repeated with another endpoint device, where another Q-TX 106b assigned to transmit the other random quantum bit stream to the Q-RX of said another endpoint device; as part of the QKD protocol, the controller 110 may then send, without limitation, for example the XOR of the successfully received bits to one or other of the end point devices and clear memory unit 144 of the random quantum bit streams that were sent to these endpoint device. Then the remainder of the QKD protocol (e.g. the BB84/modified BB84 or other protocols from the BB84 family and the like) may be performed over the classical channel(s) (C-channel) of the QKD links of these endpoint devices. At the end of the QKD protocol, each of the endpoint devices will have exchanged a key or QKD key and may use the exchange key for secure communications between the endpoint devices over the C-Channels of the QKD links assigned to each endpoint device.

Although the QTC component 140 of FIG. 1*d* has been described as including a plurality of quantum transmitters or Q-TX(s) 106a-106k for enabling quantum transmission over a quantum channel of one or more QKD links of said endpoint devices, the QTC component 106 may be further modified to include one or more quantum receivers (Q-RX(s)) in which one or more of the QKD links may each be configured to include a unidirectional or bidirectional quantum channel that couples with said one or more Q-RX(s) for receiving quantum transmissions from the corresponding endpoint to the QKD linking apparatus. As previously described, this will enable additional QKD protocols requiring an endpoint to transmit quantum information to the QKD linking apparatus to be implemented by the QKD linking apparatus and corresponding endpoint(s), where each endpoint may include a Q-TX for transmitting quantum information over a quantum channel of the QKD link to the QKD linking apparatus during operation of said additional QKD protocol and the like, and/or as the application demands.

Figure 1E:
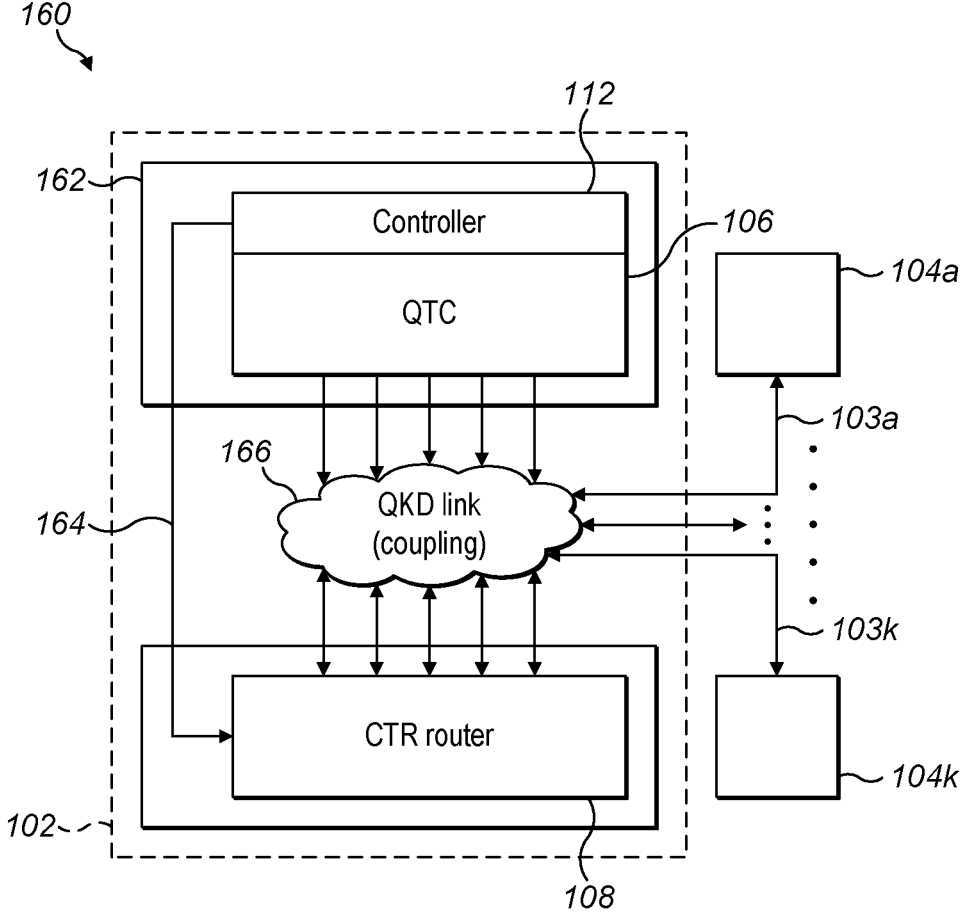
FIG. 1e is a schematic diagram illustrating another example QKD switching system according to some embodiments of the invention.

FIG. 1*e* is a schematic diagram illustrating another example QKD switching system 160 based on the QKD switching systems 100, 120 and/or 130 and/or QTC 140 as described with reference to FIGS. 1*a* to 1*d*. The QKD switching system 160 may further modify the QKD switching systems 100, 120, 130 and/or QTC 140 as described with reference to FIGS. 1*a*-1*d*. For simplicity, the reference numerals used in FIGS. 1*a*-1*d* may be reused by way of example only for similar or the same components in relation to FIG. 1*e*. The QKD switching system 160 may perform the same or similar functionality as the QKD switching systems 100, 120, 130 and/or QTC 140 as described with reference to FIGS. 1*a* to 1*d* but where the QKD linking apparatus 102 is divided into a first QKD component 162 (e.g. control and quantum transmission component functionality) that is communicatively coupled to a second QKD component 164 (e.g. switching/routing and classical transmission functionality). In this example, the first QKD component 162 includes the controller 110 and the QTC 106 or 160 as described with reference to FIGS. 1*a* to 1*d*. The second QKD component includes the classical transmission and routing component 108. The first QKD component 162 and second QKD component 164 are coupled together via QKD link coupling arrangement or functionality/component 166 (e.g. multiplexor/demultiplexor arrangement 109a-109k of FIG. 1*b* and/or one or more optical fibres as described with reference to FIG. 1*c*, modifications thereto, combinations thereof and the like). The QKD link coupling arrangement 166 couples a Q-TX of the first QKD component 162 assigned to an endpoint device 104a and couples a CRTX of the second QKD component 164 assigned to the endpoint device 104a to the same QKD link 103a allocated/assigned to the endpoint device 104a. Thus, each of the endpoint devices 104a-104k are connected via corresponding QKD links 103a-103k to the first and second QKD components 162 and 164 via the QKD link coupling component(s)/functionality 166 of the QKD switching system 160.

The controller 110 may be configured to implement one or more QKD protocols and/or QKD switching process(es) as described with reference to FIGS. 1*a* to 1*d*. Splitting the functionality of the QKD linking apparatus 102 in this manner may enable the first QKD component 162, and as an option the corresponding quantum transmission portion of the QKD linking coupling arrangement 166, to be located in a secure facility, such as an exchange, to minimise tampering or eavesdropping of the generation and/or transmission of QKD keys and the like over the QKD links to the corresponding endpoint devices 104a-104k, whereas the second QKD component 164, and as an option the corresponding classical portion of the QKD linking coupling arrangement 166, may be located in a more public setting such as, without limitation, for example a roadside cabinet to provide "last mile" of fibre and/or other secure communication medium that may share a Q-Channel and C-Channel to form a QKD link as described herein. The QKD linking coupling arrangement 166 may further include one or more fibre links for quantum communications from the exchange over the QKD links of the endpoint devices 104a-104k, which may use WDM/DWDM techniques to ensure quantum channel separation. Alternatively and/or additionally, as an option, both the first and second QKD components 162 and 164 may be configured to be used in a more public setting, such as a roadside cabinet and the like. Partitioning the first QKD component 162 from the second QKD component 164 means that the physical casing of the first QKD component 162 may be designed in a tamper-proof/tamper-evident manner, without requiring the whole QKD linking apparatus 102 to be constructed to this degree of security. Thus, the first QKD component 162 may be included in a secure tamper proof enclosure and coupled to the second QKD component 164, which is provided in a less secure enclosure via the QKD link coupling 166. In this configuration, both the first and second QKD components 162 and 166 may be implemented in the same roadside cabinet or housed in the same QKD linking apparatus and used, as long as the first QKD component 162 is in a secure tamper proof enclosure, securely in a public setting.

Although the QKD system 160 only provides one example of splitting up or partitioning the functionality of the QKD linking apparatus 102, this is byway of example only and the invention is not so limited, it is to be appreciated by the skilled person that the functionality of the QKD linking apparatus 102 i.e. the controller 110, QTC 106, CTCR 108 and QKD link coupling arrangement 166 may be split up into different modules, components apparatus as the application demands, just so as long as they are connected together or coupled together in such a manner and perform the functionality of the QKD linking apparatus 102 as described with reference to FIGS. 1a to 1e and/or 2a to 4b, modifications thereof, combinations thereto and/or as herein described.

Although the QTC component 106 of QKD linking apparatus 102 of system 160 of FIG. 1e has been described as including a plurality of quantum transmitters or Q-TX(s) for enabling quantum transmission over the quantum channel(s) of one or more QKD links of said endpoint devices, the QTC component 106 may be further modified to include one or more quantum receivers (Q-RX(s)) in which one or more of the QKD links may each be configured to include a unidirectional or bidirectional quantum channel that couples with said one or more Q-RX(s) for receiving quantum transmissions from the corresponding endpoint to the QKD linking apparatus. As previously described, this will enable additional QKD protocols requiring an endpoint to transmit quantum information to the QKD linking apparatus to be implemented by the QKD linking apparatus and corresponding endpoint(s), where each endpoint may include a Q-TX for transmitting quantum information over a quantum channel of the QKD link to the QKD linking apparatus during operation of said additional QKD protocol and the like, and/or as the application demands.

Figure 1F:
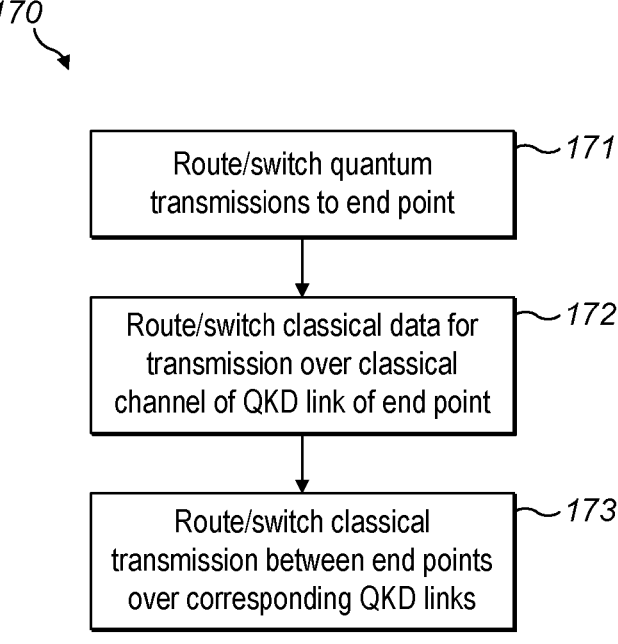
FIG. 1f is a flow diagram illustrating an example control flow for use by QKD linking apparatus of QKD switching system of any of FIGS. 1a to 1e according to some embodiments of the invention.

FIG. 1f is a flow diagram illustrating an example control process 170 for controlling a QKD linking apparatus 102 of QKD system 100, 120, 130, 140, and/or 160 as described with reference to FIGS. 1a to 1e and/or as the application demands. The control process 170 may be used to ensure the QKD linking apparatus may link at least two endpoint devices in a QKD network. The QKD linking apparatus links a plurality of endpoint devices by coupling said endpoint devices to the QKD linking apparatus via a plurality of QKD links, each QKD link for one of the endpoint devices having a communication medium including a quantum channel and a classical channel. Each endpoint is assigned a QKD link connecting said each endpoint to the QKD linking apparatus. The QKD linking apparatus includes a quantum transmission component including a plurality of quantum transmitters, each quantum transmitter configured for transmitting quantum transmissions over a quantum channel of one of the QKD links. The QKD linking apparatus includes a classical transceiver component including a plurality of classical transceivers, each classical transceiver configured for transmitting classical data over a classical channel of one of the QKD links and configured for receiving classical data over the classical channel of said one of the QKD links. Once an endpoint device is assigned a QKD link, it is assigned a quantum transmitter of the plurality of quantum transmitters and a classical transceiver of the plurality of classical transceivers and thus is coupled to the QKD linking apparatus. The QKD control process includes one or more of the following steps of:

In step 171, during operation of a QKD protocol, routing or switching data generated for quantum transmission to an endpoint via a quantum transmitter assigned to the endpoint over a quantum channel of the QKD link of the endpoint. For example, quantum transmissions are typically used when implementing one of the QKD protocols between two or more endpoint devices, where each is assigned a quantum transmitter and a corresponding QKD link. The QKD control process may further direct the quantum transmission component to route or switch quantum transmissions for an endpoint device of the two or more endpoint devices to the quantum transmitter assigned to said endpoint device for transmitting said quantum transmissions over the quantum channel of the QKD link of the endpoint device.

In step 172, during operation of a QKD protocol, routing or switching classical data for classical transmission to an endpoint via a classical transceiver assigned to the endpoint over a classical channel of the QKD link of the endpoint. For example, this may be performed when implementing one of the QKD protocols when classical transmissions are performed between the endpoints and/or between endpoint and the QKD linking apparatus. Alternatively or additionally, this may be performed when the two or more endpoints have securely exchanged keys and are performing secure communications over their corresponding QKD link classical channels and/or any other channel therebetween.

In step 173, during operation of a QKD protocol and/or after operation of QKD protocol with endpoint devices securely communicating therebetween, routing or switching classical data received from an endpoint by a classical transceiver over the classical channel of the QKD link of the endpoint to another endpoint requiring an/or addressed in said classical transmission and/or as required. For example, this may be performed when implementing one of the QKD protocols when classical transmissions are performed between the endpoints. Alternatively or additionally, this may be performed when the two or more endpoints have securely exchanged keys and are performing secure communications over their corresponding QKD link classical channels and/or any other channel therebetween.

Essentially the switching or routing of steps 171-173 of control process 170 may be performed on each message required by the QKD protocol and/or subsequent secure communications protocols and the like. For example, for QKD protocols such as, without limitation, for example the BB84 family of protocols including the modified BB84 protocol as described herein, there may be messages sent between the QKD linking apparatus and each specific endpoint device including, but not limited to: Q-channel stream of photons (with some sync signals in that or in a parallel channel) over a quantum channel (Q-channel) of the QKD link of said specific endpoint device; C-channel information over a classical channel (C-channel) of the QKD link of said specific endpoint device from QKD linking apparatus to the endpoint device; and/or C-channel information from an end-point device to the QKD linking apparatus. Of course, during the QKD protocol these Q-channel streams and C-channel information will need to be sent between the QKD linking apparatus and endpoint device in the appropriate sequence as defined by the QKD protocol, but they may be interleaved with messages between QKD linking unit and any other end-point.

As described in step 173, there may also be general data messages or encrypted data messages over the C-channel of the QKD link of the endpoint device, which are performed outside of the QKD protocols or after a QKD protocol has been performed, for transmitting any other data (e.g. secure communications using keys exchanged resulting from the QKD protocol) between any pair or group of endpoint device(s) and the like. Naturally, there will be further system management/control messages for the entire QKD system.

As an option, the QKD linking apparatus may include a plurality of quantum receivers, each quantum receiver coupled to a QKD link of an endpoint device and configured for receiving quantum transmissions over a quantum channel of the QKD link from the endpoint device, where the endpoint device transmits quantum information over the Q-channel of its QKD link according to a QKD protocol. Thus, step 171 may be further modified such that, during operation of a QKD protocol requiring the endpoint device to transmit quantum information, routing or switching data received from a quantum transmission over a QKD link from an endpoint via a quantum receiver assigned to the endpoint. For example, quantum transmissions are typically used when implementing one of the QKD protocols between two or more endpoint devices, where each may be assigned a quantum transmitter and/or a quantum receiver of the QKD linking apparatus for use over the corresponding QKD link. The QKD control process may further direct the quantum transmission component to route or switch received quantum transmissions from an endpoint device of the two or more endpoint devices for processing and/or further transmission and the like in accordance with the QKD protocol and the like.

Figure 2:
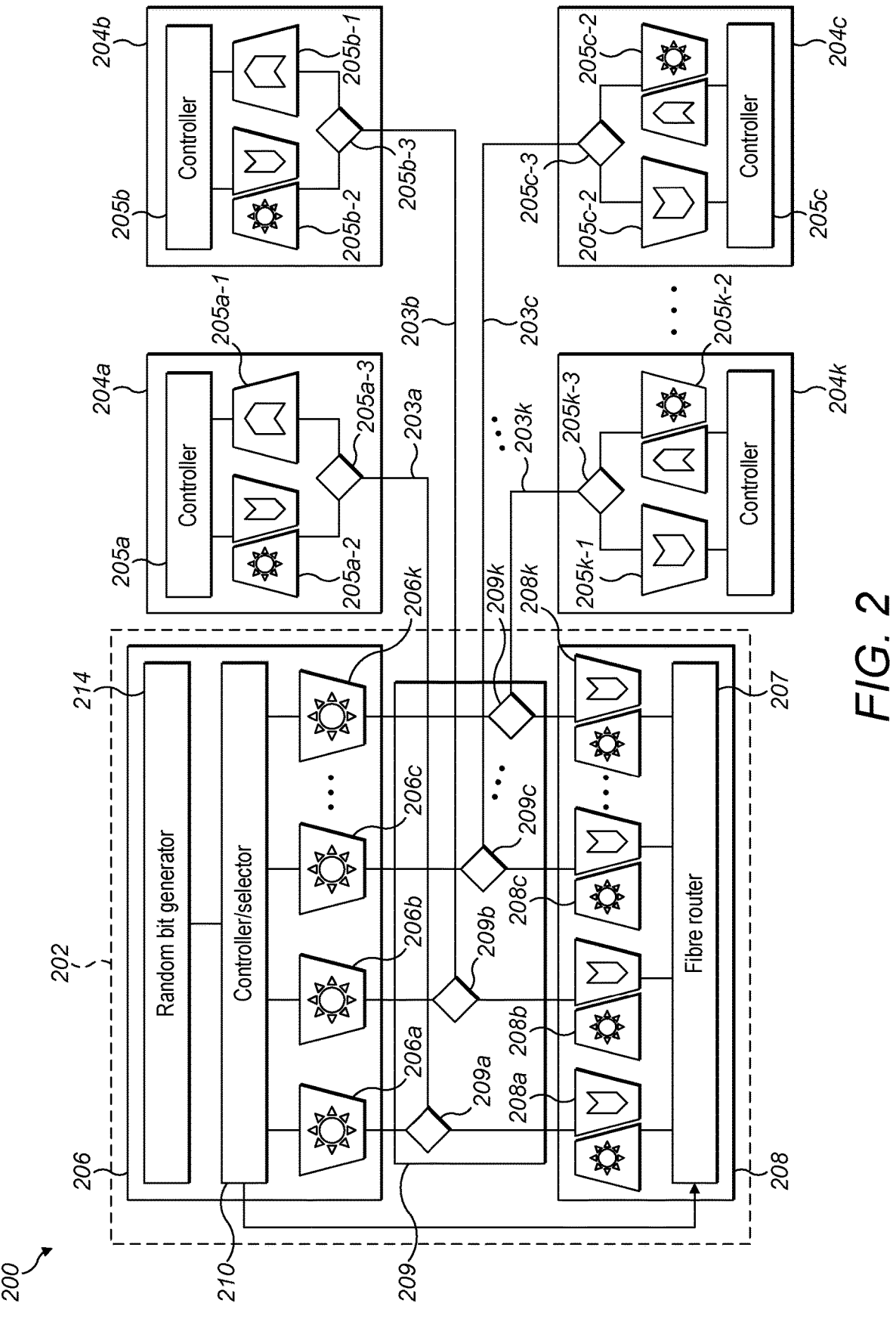
FIG. 2 is a schematic diagram illustrating another example QKD switching system according to some embodiments of the invention.

FIG. 2 is a schematic diagram illustrating another example QKD switching system 200 based on the QKD switching systems 100, 120, 130 and/or 160 and/or QTC 140 as described with reference to FIGS. 1a to 1e. QKD switching systems 100, 120, 130 and/or 160 and/or QTC 140 as described with reference to FIGS. 1a to 1e may be further modified based on the further features of the QKD switching system 200. The QKD switching system 200 is based on a hub-and-spoke model to that connects the QKD linking apparatus 202 controlled by a central linking party to multiple endpoint devices 204a-204k controlled by multiple parties through multiple QKD links 203a-203k (e.g. optical fibre links). Each of the QKD links 203a-203k include a quantum optical communications channel (Q-channel) that is shared with a conventional/classical optical communications channel (C-channel). The QKD linking apparatus 202 of the central linking party includes a quantum transmission component (QTC) 206 and a classical transceiver router component (CTRC) 208 that are connected to one or more QKD links 103a-103k via QKD link coupling arrangement 210 as described with reference to FIGS. 1a to 1 e.

The QTC 206 includes a random bit generator 209 and a plurality of quantum transmitters 206a-206k (e.g. optical fibre quantum transmitters) that are communicatively connected to a controller/selector 212. Each of the quantum transmitters 206a-206k are assigned to a different endpoint device from the plurality of endpoint devices 204a-204k. The CTRC 208 includes a plurality of classical transceivers 208a-208k (e.g. optical fibre transceivers) and a router 207 (e.g. optical fibre router), which is also connected to the controller/selector 212. Each of the plurality of classical transceivers 208a-208k are assigned to a different endpoint device from the plurality of endpoint devices 204a-204k. The controller 212 stores a mapping of the quantum transmitter 206a from the plurality of quantum transmitters 206a-206k and the classical transceiver 208a from the plurality of classical transceivers 208a-208k that is assigned to each endpoint device 204a from the plurality of endpoint devices 204a-204k. Each endpoint point device 203a from the plurality of endpoint devices 204a-204k is provided or assigned a QKD link from the plurality of QKD links 203a-203k.

As described with reference to FIGS. 1a to 1e, each QKD link includes at least a unidirectional quantum channel (Q-channel) and at least a bidirectional classical channel (C-channel). A QKD link coupling arrangement 209 is configured to couple the Q-channel and C-channel(s) of each QKD link 203a assigned to an endpoint device 204a to the quantum transmitter 206a and classical transceiver 208a assigned to the endpoint device. The Q-channel and C-channel of each QKD link 203a of each endpoint device 204a are also coupled to the corresponding quantum receiver and classical transceiver, respectively, of said each endpoint device 203a. It is noted that, in this example, each of the QKD links 203a-203k include a quantum optical communications channel that is shared with a conventional/classical optical communications channel(s) over an optical fibre. In this example, as described with reference to FIG. 1b, each of the QKD links 203a-203k uses at least one optical fibre in which the QKD link coupling arrangement 209 includes optical combiner/splitter devices 209a-209k (or optical multiplexors/demultiplexors) for coupling each of the quantum transmitters 206a-206k and each of the classical transceivers 208a-208d to a corresponding QKD link 203a-203k. Each optical combiner/splitter device 209a is configured to couple the quantum transmitter 206a and classical transceiver 208a assigned to an endpoint device 204a to one end of an optical fibre of the QKD link 203a of that endpoint device 204a, where the other end of the optical fibre of the QKD link 203a of the endpoint device 204a is coupled to an optical combiner/splitter device 205a-3 of the endpoint device, which is coupled to the quantum receiver 205a-2 and classical transceiver 205a-1 of the endpoint device 204a.

Thus, the quantum transmitter 206a assigned to the endpoint device 204a is coupled to the Q-channel of the optical fibre of the QKD link 203a via optical combiner/splitter device 209a. Similarly, the classical transceiver 208a assigned to the endpoint device 024a is coupled via optical combiner/splitter device 209a to the C-channel of the optical fibre of the QKD link 203a. The optical combiner/splitter devices 205a-3 to 205k-3 of each of the endpoint devices 204a-204k are controlled by each endpoint device 204a for directing the quantum transmissions from the Q-channel of the QKD link 203a assigned to the endpoint device 204a to the corresponding quantum receiver 205a-1 (e.g. optical fibre quantum receivers) of the endpoint device 204a. As well, the optical combiner/splitter devices 205a-3 to 205k-3 of each of the endpoint devices 204a-204k are controlled by each endpoint device 204a for directing the classical transmissions over the QKD link 203a assigned to each endpoint device to/from the corresponding classical transceiver 205a-2 (e.g. conventional optical fibre transmitters and receivers) of said each endpoint device. Many details of how keys are allocated, communications protocols, etc. have been omitted as they are standard prior art for quantum key distribution and satellite QKD. Nevertheless, the QKD switching system 200 with QKD linking apparatus 202 and endpoint devices 204a-204k connected by QKD links 203a-203k to the QKD linking apparatus 202 may be operated based on the operation of the controller 110 and/or 212, and/or QKD switching process as described with reference to FIGS. 1a to 1 e and/or as herein described.

In essence, the QTC 206 and CTRC 208 are controlled by the controller/selector 212 to perform QKD protocol operations such as, without limitation, for example generating one or more keys (or random quantum bits) using random bit generator 204; selecting the quantum transmitter 206a assigned to one of the endpoint devices 204a-204k and directing a key generated for one of the endpoint devices 204a-204k during a QKD operation to be transmitted by the selected quantum transmitter 206a over the Q-channel of the QKD link of said one of the endpoint devices 204a-204k; selecting one or more of the conventional transceivers 208a-208k assigned to one or more endpoints to transmit and/or exchange of intermediate key information and/or classical information using the classical channel(s) of the corresponding QKD links 203a-203k of those one or more endpoints when required by the QKD protocol; after quantum key exchange/QKD key exchange and the like on completion of the QKD protocol with other endpoint devices 204b-204k, routing the classical transmissions on the classical channels of the QKD links 203a-203k of said endpoint devices 204a-204k for performing secure communications therebetween, where the classical channels are secured using the exchanged keys and the like. The QKD protocols may include, without limitation, for example the BB84 protocol family including the BB84 protocol and/or derivatives of the BB84 protocol such as a modified version of BB84 protocol as described in GB Patent Application No. 1916311.2 entitled "Quantum Key Distribution Protocol" filed on 8 Nov. 2019 and incorporated herein by reference, and/or any type of QKD protocol may be used to exchange and/or transmit the quantum encoded keys and to link the pairs of keys with the endpoint devices 204a-204k. These quantum transmissions and/or classical transmissions may take place simultaneously or sequentially.

For example, the QKD linking apparatus 202 may be configured by the central linking party to perform a first QKD protocol based on matching pairs of QKD keys, then the QKD linking apparatus 202 uses the QKD key for one endpoint device 204a of a party to encrypt the key for a second endpoint device 204b of a second party, and send that encrypted key to the second endpoint device 204b of the second party, who will in turn decrypt it to obtain a copy of the first party's key. This can result in a shared key. This process may be based on the process used for satellite QKD for matching pairs of keys, however, for terrestrial QKD there is a permanent connection to the endpoint devices 204a-204k of each of the parties, which can permit simultaneous transmissions to take place, and also not require keys to be stored for lengthy periods by the QKD linking apparatus 202 of the central linking party. The QKD linking apparatus 202 may delete the keys immediately after pairing, which further eliminates the risk of key extraction through physical access to the hardware of the QKD linking apparatus 202.

In the preferred implementation, a modified version of the BB84 protocol in which the QKD linking apparatus 202 acts as the sender device of the BB84 protocol, with two or more of the endpoint devices 204a-204k of the parties acting as receiver devices of the BB84 protocol but in which the BB84 protocol is modified in such a way that the QKD linking apparatus (acting as sender device/intermediary device) does not have enough information to derive the resulting shared QKD key exchanged between the corresponding endpoint devices 204a-204k (e.g. receiver devices). Such a modified version of the BB84 protocol may be used to generate/transmit the quantum encoded keys and to link the pairs of keys in such a manner that the QKD linking apparatus 202 of the central linking party will not have any knowledge of the final agreed keys, thereby reducing the level of trust required by the QKD linking apparatus 202 and/or the central linking party by the endpoint devices 204a-204k and their controlling parties.

In practice it will be necessary to demonstrate some segregation of information within the QKD linking apparatus 202 between the quantum key generation & matching, and the conventional communications of the QKD linking apparatus 202. Otherwise it would be possible in theory to correlate the original full key with the conventional communications and derive the key values. Conventional segmentation of sub-systems of the QKD linking apparatus with physical protection of the core elements processing the quantum key, and use of firewalls/monitors should give sufficient assurance against such compromise.

The QKD linking apparatus 202 of the central linking party may be configured to perform its operations sequentially such that there is no need for all hardware components to be replicated. For example, the random generator 214 may be, without limitation, for example a single QKD RNG and each of the quantum transmitters 206a-206k may be implemented using a faint pulse source (FPS) unit. Developments in faint pulse source design will eventually lead to small and inexpensive mass-produced devices, generating the photons in an integrated package with, without limitation, for example four matched laser diodes, each of which may form one of the quantum transmitters 206a-206k. Such packages could be connected to a single RNG 214 and fast electronics through an electronic switch/selector 210, thus reducing the cost and size of the QKD linking apparatus 202 hardware. This approach may be illustrated in FIG. 2 in which the Random Bit Generator 214 (and other fast electronics) is linked to a controller and electronic selector 212. The controller and selector 212 are configured to select which optical quantum transmitter 206a-206k to use, coupling the electronic drive signals from the controller 212. The QKD linking arrangement 209 includes optical combiner/splitter devices 209a-209k, where each optical combiner/splitter device 209a is are connected to a quantum transmitter 206a assigned to an endpoint device 204a and a corresponding classical transceiver 208a assigned to the endpoint device 204a and so couples the quantum transmitter 206a (e.g. optical fibre quantum transmitter) and the classical transceiver 208a (e.g. conventional optical fibre transmitters and receivers) to the Q-channel and C-channel(s), respectively, of at least one optical fibre of the QKD link 203a of the endpoint device 204a. The optical combiner/splitters 205a-3 to 205k-3 of each of the endpoint devices 204a-204k are controlled for directing the quantum transmissions over the QKD links 203a-203k to the corresponding quantum receivers 205a-1 to 205k-1 (e.g. optical fibre quantum receivers) and/or the classical transmissions over the QKD links 203a-203k to the corresponding classical transceivers 205a-2 to 205k-2 (e.g. conventional optical fibre transmitters and receivers). Many details of how keys are allocated, communications protocols, etc. have been omitted as they are standard prior art for quantum key distribution and satellite QKD. Nevertheless, the QKD switching system 200 with QKD linking apparatus 202 and endpoint devices 204*a*-204*k* connected by QKD links 203*a*-203*k* may be operated as described with reference to FIGS. 1*a* to 1*e* and/or as herein described.

Although the QTC component 206 of FIG. 2 has been described as including a plurality of quantum transmitters or Q-TX(s) 206*a*-206*k* for enabling quantum transmission over a quantum channel of one or more QKD links 203*a*-203*k* of said endpoint devices 204*a*-204*k*, the QTC component 206 may be further modified to include one or more quantum receivers (Q-RX(s)) in which one or more of the QKD links 203*a*-203*k* may each be configured to include a unidirectional or bidirectional quantum channel (e.g. an optical fibre) that couples with said one or more Q-RX(s) of the QKD linking apparatus 202 for receiving quantum transmissions from the corresponding endpoint to the QKD linking apparatus 202, which may be required depending on the QKD protocol being implemented therebetween. As previously described, this will enable additional QKD protocols requiring an endpoint to transmit quantum information to the QKD linking apparatus 206 to be implemented by the QKD linking apparatus 206 and corresponding endpoint(s), where each endpoint may include a Q-TX for transmitting quantum information over a quantum channel of the corresponding QKD link to the QKD linking apparatus 202 during operation of said additional QKD protocol and the like, and/or as the application demands.

Figure 3A:
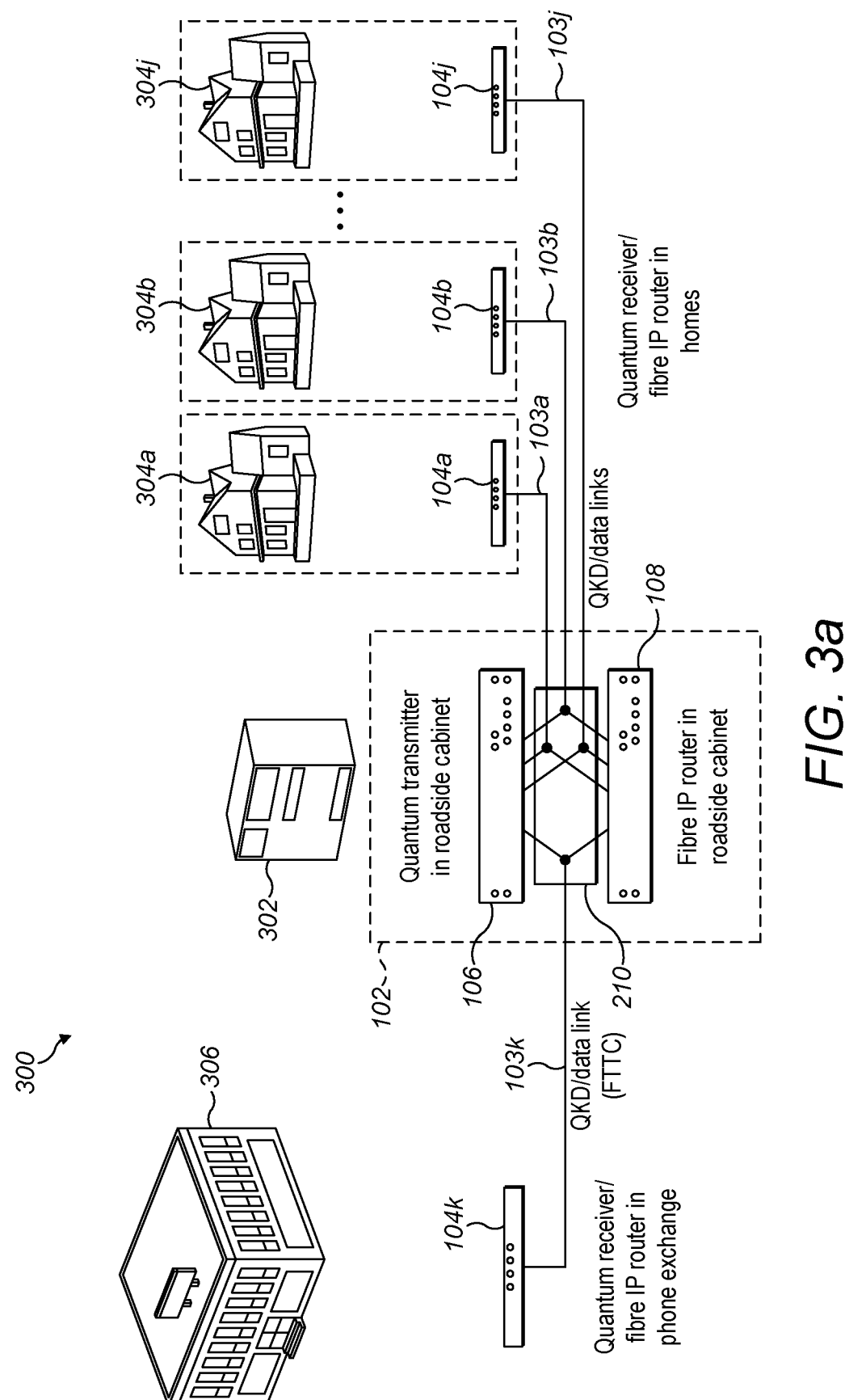
FIG. 3a is a schematic diagram illustrating an example QKD switching system with link apparatus in a roadside cabinet according to some embodiments of the invention.

FIG. 3*a* is a schematic diagram illustrating an example QKD switching system 300 with a QKD linking apparatus 102 located within a roadside cabinet 302. The QKD linking apparatus 102 may be based on the QKD linking apparatus 102 or 202 as described with reference to FIGS. 1*a* to 2, modifications thereto, combinations thereof, and/or as herein described and/or as the application demands. For simplicity, the reference numerals used in FIGS. 1*a*-1*e* or 2 may be reused by way of example only for similar or the same components in relation to FIG. 3*a*. This is one of many methods of deploying the QKD linking apparatus 102 and/or QKD switching system 300, where individual houses or offices 304*a*-304*j* or exchange 306 are linked to the roadside cabinet 302 via QKD links 103*a*-103*k* using endpoint devices 104*a*-104*k*, in which traffic from endpoint devices 104*a*-104*j* are then back-hauled over QKD link 103*k* to the exchange/switching centre 306 with endpoint 104*k*. In this example, there may be a point-to-point optical path through the fibre, from the roadside cabinet 302 to the endpoint devices 104*a*-104*j* controlled by the various parties (e.g. home owners, office workers and the like) of homes/offices 304*a*-304*j* and to the exchange 306. The roadside cabinet 302 includes the QTC 106 (e.g. quantum transmitters 106*a*-106*k*) and CTCR 108 (e.g. conventional fibre router and optical fibre transceivers 108*a*-108*k*).

The QKD switching system 300 may further modify the QKD switching systems 100, 120, 130, 160, 200 and/or QTC 140 as described with reference to FIGS. 1*a* to 2, modifications thereto, combinations thereof, and/or as herein described. For simplicity, the reference numerals used in FIGS. 1*a* to 2 may be reused byway of example only for similar or the same components in relation to FIG. 3*a*. The QKD switching system 300 may include and/or perform the same or similar functionality as the QKD switching systems 100, 120, 130, 160, 200 and/or QTC 140 as described with reference to FIGS. 1*a* to 2 in which the QKD linking apparatus 102 is located within a public space such as a roadside cabinet 302. In this example, the QKD linking apparatus 102 includes QTC 106, CTCR 108 and QKD link coupling arrangement 210 as described with reference to any of FIGS. 1*a* to 2, modifications thereof, combinations thereto and/or as herein described. The QKD linking apparatus 102 is configured to provide quantum-safe or secure communications over the QKD links 103*a*-103*k* with endpoint devices 104*a*-104*k* at homes/offices 304*a*-304*k* based on QKD protocols and the like. In this example, the QKD switching system 300 includes a plurality of homes/offices 304*a*-304*j* in which each of the homes/offices 304*a*-304*j* has a corresponding one of the endpoint devices 104*a*-104*j* that may function as described with reference to FIGS. 1*a* to 2. Each of the homes/offices 304*a*-304*j* includes at least one of the endpoint devices 104*a*-104*j*, each of which are coupled to the QKD link coupling arrangement 210 of the QKD linking apparatus 102 via corresponding QKD links 103*a*-103*j* (e.g. optical fibre links). Each endpoint device 104*a*-104*j* of a home/office 304*a*-304*j* may include a quantum receiver and a fibre IP router that is coupled to the corresponding QKD links 103*a*-103*j*. The communication medium of each of the QKD links 103*a*-103*j* between QKD linking apparatus 102 of the roadside cabinet 302 and to the homes/offices 304*a*-304*j* may be at least one optical fibre. In addition, in this example, the QKD switching system 300 includes a backhaul over QKD link 103*k* to the exchange 306 with an endpoint device 104*k* that is configured according to endpoint devices as described with reference to FIGS. 1*a* to 2. The endpoint device 104*k* of the exchange 306 may include a quantum receiver and fibre IP router. The exchange 306 is coupled from the endpoint device 104*k* to the QKD link coupling arrangement 210 in the QKD linking apparatus 102 located in the roadside cabinet 302 via a QKD link 103*k* (e.g. QKD/data link over fibre to the cabinet (FTTC)). Thus, quantum-secure or safe communications may be implemented between the exchange 306, homes/offices 304*a*-304*j* and roadside cabinet 302 using the QKD switching apparatus 102 and appropriate QKD protocols for exchanging QKD keys, group keys and the like between the endpoint devices 104*a*-104*k* of the exchange 306 and homes/offices 304*a*-304*j* and the like, which may form part of a QKD network and thus may enable quantum-safe or secure communications therebetween.

Other deployments may include, without limitation, for example: 1) having the communication medium of each of the QKD links 103*a*-103*k* being separate optical fibres for quantum communications and conventional communication to each endpoint device 104*a*-104*k*. Although this might increase the cost of using more optical fibre, such an implementation minimises or avoids the requirement for additional optical combiner/splitter units and the like; 2) a combined quantum and conventional hub, with built-in optical combiner/splitter units, which may be more convenient for connections, but makes it more difficult to verify the security separation of individual components; and/or 3) multiple back-haul QKD links may be provided, where the exchange 306 is not treated specially from other end-point devices 104*a*-104*k*, though may be providing greater bandwidth for conventional communications.

Figure 3B:
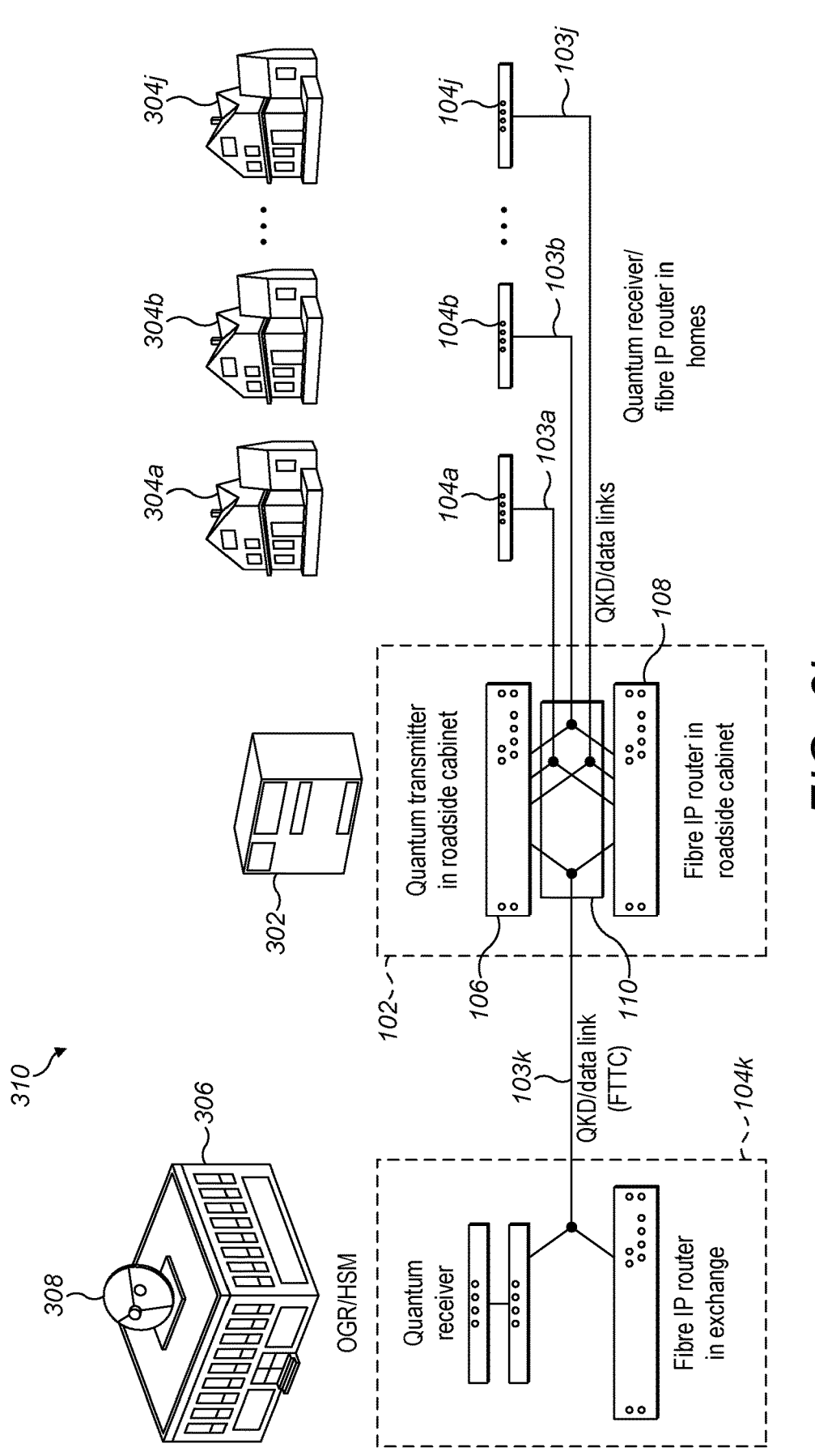
FIG. 3b is a schematic diagram illustrating another example QKD switching system with link apparatus in a roadside cabinet according to some embodiments of the invention.

FIG. 3*b* is a schematic diagram illustrating another example QKD switching system 310 with QKD linking apparatus 102 in a roadside cabinet 302. This configuration is similar to that of FIG. 3*a*, but includes a link to a QKD optical ground receiver (OGR) terminal 308 in or near the exchange 306 with the endpoint device 104*k*.

Figure 3C:
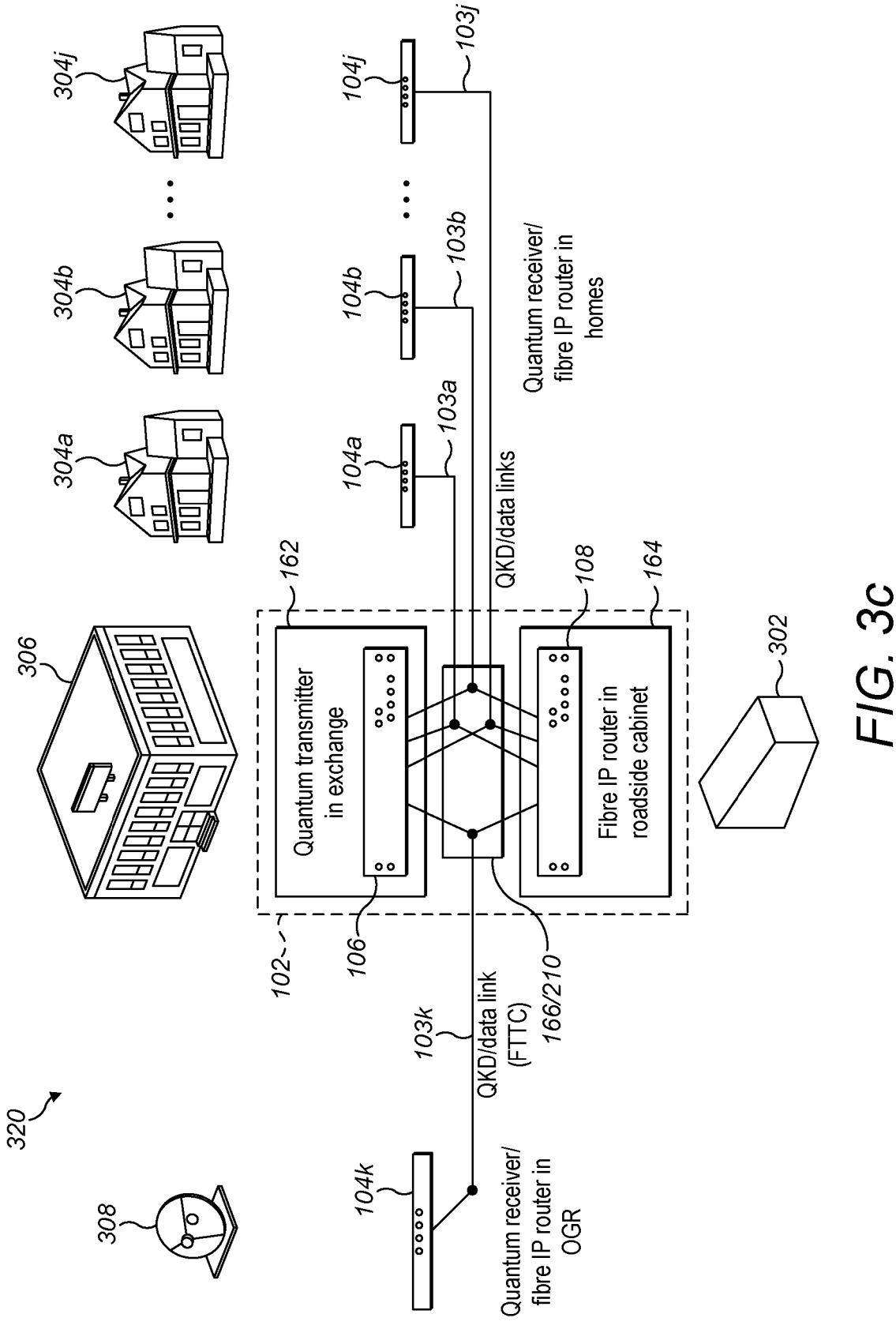
FIG. 3c is a schematic diagram illustrating a further example QKD switching system with the functionality of link apparatus split between an exchange and a roadside cabinet according to some embodiments of the invention.

FIG. 3*c* is a schematic diagram illustrating a further example QKD switching system 320 with the functionality of QKD link apparatus 102 split between roadside cabinet 302 and an exchange 306. The QKD switching system 320 may further modify the QKD switching systems 100, 120, 130, 160, 200, 300, 310 and/or QTC 140 as described with reference to FIGS. 1a to 3b, modifications thereto, combinations thereof, and/or as herein described. For simplicity, the reference numerals used in FIGS. 1a to 3b may be reused by way of example only for similar or the same components in relation to FIG. 3c. The QKD switching system 320 may perform the same or similar functionality as the QKD switching systems 100, 120, 130, 160, 200, 300, 310 and/or QTC 140 as described with reference to FIGS. 1a to 3b but where the QKD linking apparatus 102 is split between the exchange 306 and the roadside cabinet 302. In this example, the QKD linking apparatus 102 is split into a first QKD component 162 that operates within the exchange 306 and a second QKD component 164 that operates within the roadside cabinet 302 a similar manner as described with reference to FIG. 1e. The first QKD component 162 of the QKD linking apparatus 102 that is within the exchange 306 includes a QTC 106 as described with reference to FIGS. 1a to 3b. The second QKD component 164 of the QKD linking apparatus 102 that is within the roadside cabinet 302 includes a CTCR 108 and/or a QKD link coupling arrangement 210 or 166 as described with reference to FIG. 1a to 3c. The QKD linking apparatus 102 is configured to, via the first and second QKD components 162 and 164 and QKD link coupling arrangement 210/166, to provide quantum-safe or secure communications over the QKD links 103a-103k with endpoint devices 104a-104k based on QKD protocols and the like. In this example, the QKD switching system 320 includes a plurality of homes 304a, 304b to 304j in which each of the homes 304a-304j has a corresponding one of the endpoint devices 104a-104j that may function as described with reference to FIGS. 1a to 3b. Each of the homes 304a-304j includes at least one of the endpoint device 104a-104j, each of which are coupled to the QKD link coupling arrangement 210/166 of the second QKD component 164 (and/or first QKD component 162) of QKD linking apparatus 102 via corresponding QKD links 103a-103j (e.g. optical fibre links). Each endpoint device 104a-104j of a home 304a-304j may include a quantum receiver and a fibre IP router that is coupled to the corresponding QKD links 103a-103j. The communication medium of each of the QKD links 103a-103j may be at least one optical fibre. In addition, in this example, the QKD switching system 320 includes an OGR 308 with an endpoint device 104k that is configured according to endpoint devices as described with reference to FIGS. 1a to 3b. The endpoint device 104k of the OGR 308 may include a quantum receiver and fibre IP router. The OGR 308 is coupled from the endpoint device 104k to the QKD link coupling arrangement 166/210 in the second QKD component 164 of QKD linking apparatus 102 located in the roadside cabinet 302 via a QKD link 103k (e.g. QKD/data link over fibre to the cabinet (FTTC)). Thus, quantum-secure or safe communications may be implemented between the OGR 308, exchange 306, homes 304a-304j and roadside cabinet 302 using the QKD switching apparatus 102 and appropriate QKD protocols for exchanging QKD keys, group keys and the like between the endpoint devices of the OGR 308 and homes 304a-304j and the like, which may form part of a QKD network and thus may enable quantum-safe or secure communications therebetween.

Although the QTC component 106 of any of FIGS. 3a to 3c may have been described as including a plurality of quantum transmitters or Q-TX(s) for enabling quantum transmission over a quantum channel of one or more QKD links 103a-103k of said endpoint devices 104a-104k, the QTC component 106 of any of FIGS. 3a to 3c may be further modified to include one or more quantum receivers (Q-RX (s)) in which one or more of the QKD links 103a-103k may each be configured to include a unidirectional or bidirectional quantum channel (e.g. an optical fibre) that couples with said one or more Q-RX(s) of the QTC component 106 of the QKD linking apparatus 102 for receiving quantum transmissions from the corresponding endpoint to the QKD linking apparatus 102, which may be required depending on the QKD protocol being implemented therebetween. As previously described, this will enable additional QKD protocols requiring an endpoint to transmit quantum information to the QTC component 106 of the QKD linking apparatus 102 to be implemented by the QKD linking apparatus 102 and corresponding endpoint(s), where each endpoint may include a Q-TX for transmitting quantum information over a quantum channel of the corresponding QKD link to the QKD linking apparatus 102 during operation of said additional QKD protocol and the like, and/or as the application demands.

Figure 4:
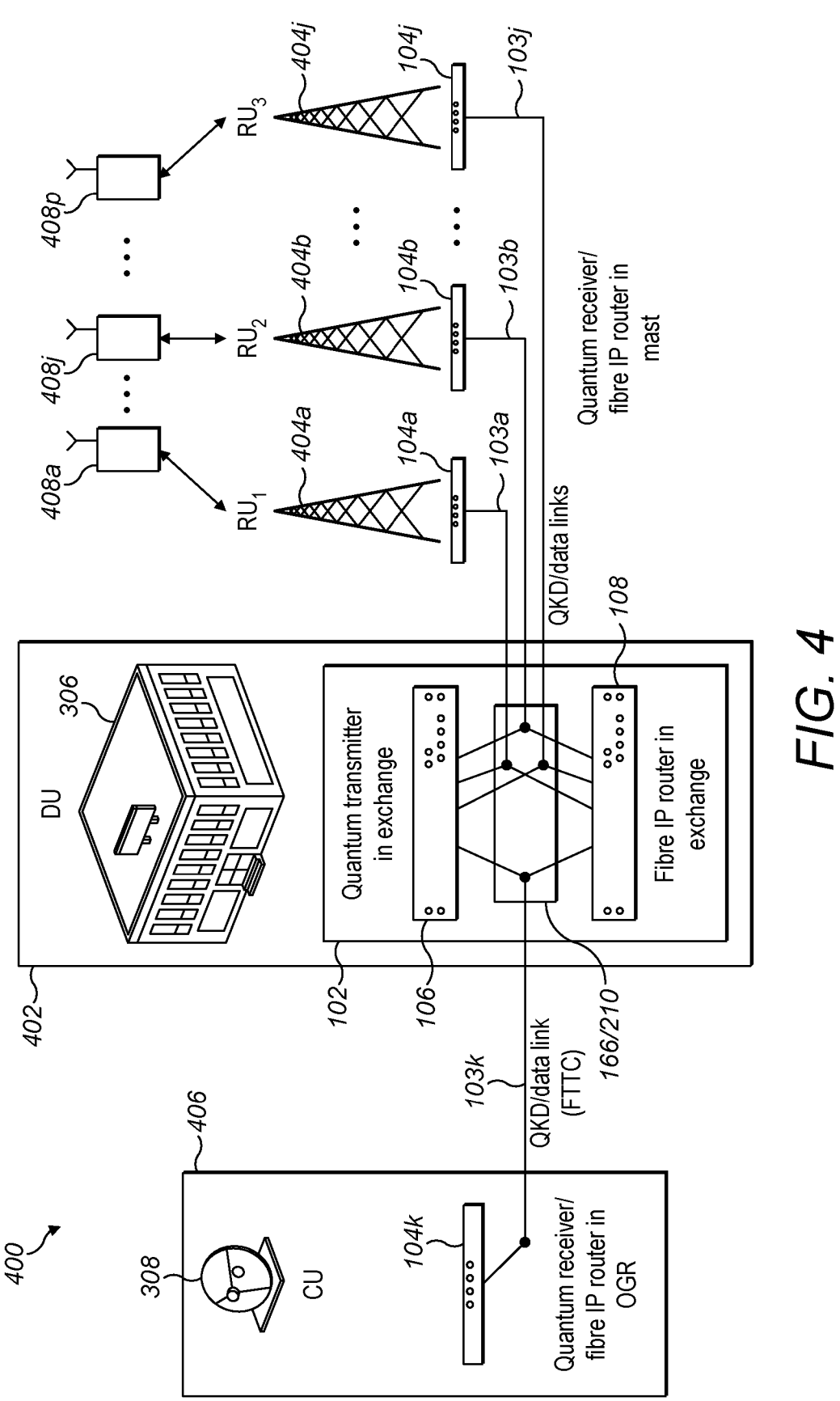
FIG. 4 is a schematic diagram illustrating an example 5G QKD switching system with endpoints being in 5G radio masts according to some embodiments of the invention.

FIG. 4 is a schematic diagram illustrating an example a 5G QKD switching system 400 for use with a 5G radio access network (RAN) system with endpoint devices 104a-104j being located in corresponding 5G radio masts 404a-404j. The QKD switching system 400 may further modify the QKD switching systems 100, 120, 130, 160, 200, 300, 310, 320 and/or QTC 140 as described with reference to FIGS. 1a to 3c, modifications thereto, combinations thereof, and/or as herein described. For simplicity, the reference numerals used in FIGS. 1a to 3c may be reused by way of example only for similar or the same components in relation to FIG. 4. The 5G QKD switching system 400 may perform the same or similar functionality as the QKD switching systems 100, 120, 130, 160, 200, 300, 310, 320 as described with reference to FIGS. 1a to 3c but where the QKD linking apparatus 102 is located within the distributed unit (DU) 402 of the 5G RAN system. In this example, the 5G QKD switching system 400 includes a distributed unit (DU) 402, a plurality of radio masts or radio units (RUs) 404a-404j and a centralized unit (CU) 406. The radio masts or RUs 404a-404j (e.g. RU1, RU2, and/or RUk) are configured to service a plurality of mobile units 408a-408p. The DU 402 includes an exchange 306 with a QKD linking apparatus 102, the QKD linking apparatus including a QTC 106, CTCR 108 and a QKD link coupling arrangement 166/210 as described with reference to FIGS. 1a to 3c. The QKD linking apparatus 102 is located in the exchange 306 and provides quantum-safe or secure communications based on QKD protocols for the CU 406 and RUs 404a-404j. Each of the RUs 404a-404j include at least one of the endpoint devices 104a-104j, each of which are coupled via the QKD link coupling arrangement 166/210 to the QKD linking apparatus 102 with corresponding QKD links 103a-103j (e.g. optical fibre links). Each endpoint device 104a-104j of an RU 404a-404j may include a quantum receiver and a fibre IP router that is coupled to the QKD link 103a-103j. The communication medium of each of the QKD links 103a-103j may be at least one optical fibre. The CU 406 includes an OGR 308 and an endpoint device 104k configured according to endpoint devices as described with reference to FIGS. 1a to 3c. The endpoint device 104k of the OGR 308 may include a quantum receiver and fibre IP router. The CU 406 is coupled via the endpoint device 104k of the OGR 306 to the QKD linking apparatus 102 of the DU 402 via a QKD link 103k (e.g. QKD/data link over fibre to the cabinet (FTTC)) to the QKD link coupling arrangement 166/210 of the QKD linking apparatus 102, which is located in an exchange 306 of the DU 402. Thus, quantum-secure or safe communications may be implemented in the CU, DU and RUs of a 5G RAN system using the QKD linking apparatus 102 and appropriate QKD protocols for exchanging QKD keys, group keys and the like between the nodes, entities, network nodes/entities, components of the CU, DU and RUs, which may form part of a QKD network and thus may enable quantum-safe or secure communications therebetween. Thus, the QKD switching system 100 may be used to enhance the security functions of a core communications network such as, without limitation, for example a 5G RAN system.

Although the QTC component 106 of FIG. 4 may have been described as including a plurality of quantum transmitters or Q-TX(s) for enabling quantum transmission over a quantum channel of one or more QKD links 103*a*-103*k* of said endpoint devices 104*a*-104*k*, the QTC component 106 of FIG. 4 may be further modified to include one or more quantum receivers (Q-RX(s)) in which one or more of the QKD links 103*a*-103*k* may each be configured to include a unidirectional or bidirectional quantum channel (e.g. an optical fibre) that couples with said one or more Q-RX(s) of the QTC component 106 of the QKD linking apparatus 102 for receiving quantum transmissions from the corresponding endpoint to the QKD linking apparatus 102, which may be required depending on the QKD protocol being implemented therebetween. As previously described, this will enable additional QKD protocols requiring an endpoint to transmit quantum information to the QTC component 106 of the QKD linking apparatus 102 to be implemented by the QKD linking apparatus 102 and corresponding endpoint(s), where each endpoint may include a Q-TX for transmitting quantum information over a quantum channel of the corresponding QKD link to the QKD linking apparatus 102 during operation of said additional QKD protocol and the like, and/or as the application demands.

As described above with reference to FIGS. 1*a* to 4 and/or as described herein, the QKD linking apparatus 102 or 202 of QKD systems 100, 120, 130, 140, 160, 200, 300, 310, 320, and 400 of FIGS. 1*a* to 4 may be used, depending on the configuration of each of the QKD links of each of the endpoint devices that communicatively couple the endpoint devices to the QKD linking apparatus, with any suitable type of key exchange or QKD protocol for securely exchanging a key (or QKD key) between the endpoint device(s) and/or the QKD linking apparatus using the quantum channel(s) and corresponding classical/non-quantum communication channels of the corresponding QKD links. In the following, the reference numerals of FIGS. 1*a* to 4 may be used for similar or the same features and/or components. As described above, each endpoint device 104*a*/204*a* has a QKD link 103*a*/203*a* that couples the endpoint device 104*a*/204*a* to each other endpoint device 104*b*/204*b* via the QKD linking apparatus 102/202. Thus, for example, two or more endpoint device(s) 104*a*-104*k*/204*a*-204*k* may perform a QKD protocol or key exchange protocol that uses the corresponding quantum channels and classical communication channels provided by the QKD links 103*a*-103*k*/203*a*-203*k* connecting the endpoint devices 104*a*-104*k*/204*a*-204*k* to the QKD linking apparatus 102/202. Thus, the QKD linking apparatus 102/202 may act as an intermediary device for enabling a QKD protocol for key exchange to be performed for one or more endpoint devices 104*a*-104*k*/204*a*-204*k*. Any suitable or secure QKD protocol for key establishment may thus be implemented to ensure at least two endpoint devices 104*a*-104*k*/204*a*-204*k* securely share or establish/negotiate the same cryptographic key. There may be a plurality of QKD protocol(s) that may be used by the QKD linking apparatus 102/202 and endpoint devices 104*a*-104*k*/204*a*-204*k* that make use of the corresponding QKD links, the QKD protocols may be based on, without limitation, for example the BB84 protocol; the modified BB84 protocol as herein described; any QKD protocol from the BB84 family of protocols; any other QKD protocol capable of making use of a quantum channel and non-quantum channel of each of the QKD links 103*a*-103*k*/203*a*-203*k*; any other quantum key exchange protocol used to establish and/or exchange a shared key between at least two or more endpoint devices 104*a*-104*k*/204*a*-204*k* and/or at least one endpoint device 104*a*/204*a* and a third party, an intermediary or cloud service and the like; any QKD protocol in which the exchanged key may be based on quantum key distributed keys and/or may be a quantum-safe or quantum secure key due to the QKD protocol being a quantum-secure key establishment protocol establishes a QKD shared key between the endpoint devices 104*a*-104*k*/204*a*-204*k* and the like; combinations thereof, modifications thereto and the like.

For example, the BB84 QKD protocol is a well-known QKD protocol using photon polarisation bases to transmit the information that may be used to exchange a shared key between a first and second endpoint device 104*a*-104*b* via an intermediary device 102 such as the QKD linking apparatus 102. The BB84 QKD protocol may use a set of bases including at least two pairs of conjugate photon polarisation bases (e.g. a set of bases including, without limitation, for example a rectilinear photon basis (e.g. vertical (0°) and horizontal (90°) polarisations) and diagonal photon basis (e.g. 45° and 135° polarisations) or the circular basis of left- and right-handedness etc.) In the BB84 protocol, QKD is performed between a sender device or QKD linking apparatus 102 (e.g. often referred to as Alice) and a first endpoint device 104*a* (e.g. often referred to as Bob) and a second endpoint device 104*b* (e.g. often referred to as Carol). The BB84 protocol is a QKD key exchange protocol that can make use of the quantum communication channel of the QKD link 103*a* between the first device 104*a* and the sender device or QKD linking apparatus 102, and another quantum communication channel of the QKD link 103*b* between the second endpoint device 104*b* and the sender device or QKD linking apparatus 102 in which the first endpoint device 104*a* and second endpoint device 104*b* exchange and share the same cryptographic key. The sender device 102 and first endpoint device 104*a* are connected by the quantum communication channel of the QKD link 103*a* therebetween, which allows quantum information (e.g. quantum states) to be transmitted from the sender device 102 to the first endpoint device 104*a*. As well, the sender device 102 and second endpoint device 104*b* are connected by another quantum communication channel of QKD link 103*b* therebetween which allows quantum information (e.g. quantum states) to be transmitted from the sender device 102 to the second endpoint device 104*b*. Each quantum channel may be, without limitation, for example, an optical fibre or optical free space. Furthermore, the sender device 102 and first endpoint device 104*a* (and sender device 102 and second endpoint device 104*b*) also communicate over a non-quantum channel or public classical channel of their corresponding QKD links 103*a* or 103*b*, respectively. The non-quantum channels may be, without limitation, for example a fibre optic channel, telecommunications channel, radio channel, broadcast radio or the internet and/or any other wireless or wired communications channel and the like. As well, when negotiating the key the first and second endpoint devices 104*a* and 104*b* may communicate over the non-quantum channel or classical channel via their respective QKD links 103*a* and 103*b*, respectively, for exchanging the final shared cryptographic key between the first and second endpoint devices 104*a*-104*b*. The BB84 protocol requires that the sender device or QKD linking apparatus 102 (e.g. a third party or intermediary) be used to perform the key exchange/establishment between the first and second endpoint devices 104*a*-104*b* to be a trusted device.

In another example, a modified version of BB84 protocol as described in GB Patent Application No. 1916311.2 entitled "Quantum Key Distribution Protocol" filed on 8 Nov. 2019 and incorporated herein by reference, and/or any type of QKD protocol may be used by the sender device or QKD linking apparatus 102 and/or corresponding endpoint devices 104*a*-104*b* to exchange and/or transmit the quantum encoded keys and share a quantum-secure cryptography key between at least a pair of endpoint devices 104*a*-104*b*. The modified version of the BB84 protocol may be configured or implemented such that the sender device or QKD linking apparatus 102 (e.g. third party device/intermediary) and the like does not have knowledge of the final agreed quantum-secure key between the first and second endpoint devices 104*a*-104*b*. This means that the level of trust required by the sender device or QKD linking apparatus 102 may be reduced or untrusted but where the shared key between first and second endpoint devices 104*a*-104*b* is only known to the first and second endpoint devices 104*a*-104*b*. This may be useful for when the QKD linking apparatus or sender device 102 is operated or used in a public setting such as, for example, in a roadside cabinet or other public telecommunication site.

In the modified version of the BB84 protocol, the sender device or QKD linking apparatus 102 (which may be a terrestrial fibre optic device) may use a random bit generator 142/214 to generate a first QKD key, where a controller 112/160/electronic switch 147 may be used to route/switch the first QKD key (generated random bit stream) to the quantum transmitter (Q-TX) 106*a* assigned to the first endpoint device 104*a* for transmitting the first QKD key to the first endpoint device 104*a* over the first QKD link 103*a* including a first quantum channel (e.g. optical channel/fibre). In addition, the sender device/QKD linking apparatus 102 also switches/routes the transmitted basis used to send the first QKD key to a CTRX 108*a* of the CTRC component 108 that is assigned to the first endpoint device 104*a* for transmission of the transmitted basis over a first classical channel of the first QKD link 103*a* of the endpoint device 104*a*. The first endpoint device 104*a* does not reveal the received basis that is used by the first endpoint device 104*a* to receive the QKD key over the first quantum channel of the QKD link 103*a* of the first endpoint device 104*a*. This means the sender device or QKD linking apparatus 102 only knows approximately 50% of the bits of the first QKD key received by the first endpoint device.

This process is repeated with the second endpoint device 104*b* and sender device 102 for a second QKD key. That is, the sender device 102 may use the random bit generator 142/214 to generate a second QKD key, where a controller 112/160/electronic switch 147 may be used to route/switch the second QKD key (generated random bit stream) to the quantum transmitter (Q-TX) 106*b* assigned to the second endpoint device 104*b* for transmitting the second QKD key to the second endpoint device 104*b* over the second QKD link 103*b* including a second quantum channel (e.g. optical channel/fibre). In addition, the sender device/QKD linking apparatus 102 also switches/routes the transmitted basis used to send the second QKD key to a CTRX 108*b* of the CTRC component 108 that is assigned to the second endpoint device 104*b* for transmission of the transmitted basis over a second classical channel of the second QKD link 103*b* of the endpoint device 104*b*. The second endpoint device 104*b* does not reveal the received basis that is used by the second endpoint device 104*b* to receive the second QKD key over the second quantum channel of the second QKD link 103*b* of the second endpoint device 104*b*. This means the sender device 102 only knows approximately 50% of the received bits of the second QKD key too.

The sender device or QKD linking apparatus 102 then XORs the first and second QKD keys together and sends the XOR'ed keys to the second endpoint device 104*a* over the second classical channel of the second QKD link 103*b* or even to both parties over the classical channels of their QKD links 103*a*/103*b*. The first and second endpoint devices 104*a* and 104*b* communicate over the first classical channel and second classical channels of their QKD links 103*a* and 103*b*, respectively, via the QKD linking apparatus 102 to discover the correctly-measured bases, generating a new raw key of about 25% of the original bits transmitted, where they then perform error correction and the like to generate a final shared key, which becomes a precursor key negotiated between the first and second endpoint devices 104*a*-104*b*.

Alternatively or additionally, rather than the sender device 102 simply XORing the first and second QKD keys, each of the first and second endpoint devices 104*a* and 104*b* may be configured to send only an indication (e.g. bit positions) of what they consider to be the correctly received symbols of the first and second QKD keys, respectively, over the classical channels of their respective first and second QKD links 103*a* and 103*b* to the sender device 102. The sender device 102 then sends over the classical channels of the respective first and second QKD links 103*a* and 103*b* the actual basis used for transmitting only the correctly received symbols to each corresponding first and second endpoint device 104*a* and 104*b*. The sender device or QKD linking apparatus 102 then XORs the first and second QKD keys and only sends the correctly received symbols of the XOR'd first and second QKD keys to the second endpoint device 104*b* over the classical channel of the second QKD link 103*b*. The first and second endpoint devices 104*a* and 104*b* communicate via the QKD linking apparatus 102 over their corresponding classical communication channels of the first and second QKD links 103*a* and 103*b* to discover the correctly-measured bases, generating a new raw key of about 25% of the original bits transmitted, where they then perform error correction and the like to generate a final shared key, which becomes a precursor key negotiated between the first and second endpoint devices 104*a* and 104*b*.

As another example, the above example QKD protocol that modifies the BB84 protocol may be for when each symbol represents $2^n$ binary bits, for $n \geq 1$. When each symbol represents a binary bit for $n=1$, the steps of this QKD protocol may be based on the following: the sender device 102 is configured to transmit a first secret bit string (e.g. QKD key) over a first quantum channel of the first QKD link 103*a* to the first endpoint device 104*a*, each bit of the first secret bit string modulated by a basis state randomly selected from a set of bases; the sender device 102 also transmits a first basis set over a first classical communication channel of the first QKD link 103*a* to the first endpoint device 104*a*, the first basis set comprising data representative of the randomly selected bases used to modulate each bit of the first secret bit string; the sender device 102 may also transmit a second secret bit string (e.g. second QKD key) over a second quantum channel of the second QKD link 103*b* to the second endpoint device 104*b*, each bit of the second secret bit string modulated by a basis state randomly selected from the set of bases; the sender device 102 also transmits a second basis set over a second classical communication channel of the second QKD link 103*b* to the second endpoint device 104*b*, the second basis set comprising data representative of the randomly selected bases used to modulate each bit of the second secret bit string. The sender device 102 then generates a third bit string based on combining the first and second secret bit strings (e.g. XOR-ing the first and second secret bit strings), and transmits the third bit string to the second endpoint device 104*b* via the second communication channel of the second QKD link 103*b* of the second endpoint device 104*b*.

The first endpoint device 104*a* and second endpoint device 104*b* perform a quantum key exchange to establish a shared key based on: the first endpoint device 104*a* using the received first basis set to determine a first received set of secret bits comprising bits of the first secret bit string transmitted over the first quantum channel of the first QKD link 103*a* that were successfully received by the first endpoint device 104*a*; the second endpoint device 104*b* uses the received second basis set to determine a second received set of secret bits comprising bits of the second secret bit string transmitted over the second quantum channel of the second QKD link 103*b* of the second endpoint device 104*b* that were successfully received by the second endpoint device 104*b*; the second endpoint device 104*b* generates a fourth set of bits based on combining the second received set of secret bits with the received third bit string (e.g. XORing the second received set of secret bits with the received third bit string), where one or more bits of the fourth set of bits correspond to one or more bits of the first bit string; the first endpoint device 104*a* and second endpoint device 104*b* perform bit sifting operations and the like over either the first and second classical communication channels of the first and second QKD links 104*a* and 104*b* and/or over a third classical communication channel therebetween based on the first received set of secret bits at the first endpoint device 104*a* and the fourth set of bits at the second endpoint device 104*b* for generating a common set of sifted bits for forming a shared cryptographic key at the first and second endpoint devices 104*a* and 104*b*.

The modified version of the BB84 QKD protocol mini-mises interactions between the sender device 102 and the first and second endpoint devices 104*a* and 104*b*, which means the sender device 102 receives nearly no information associated with what secret symbols the first and second endpoint devices 104*a* and 104*b* validly received, which means this may result in a higher level of security than those QKD protocols such as BB84 that share information with the sender device 102. However, this trade-off is typically at the expense of reliability and/or a reduction in the number of viable symbols that may be used for generating the common set of sifted symbols and subsequent formation of the cryptographic key using the common set of sifted symbols. The reliability and/or viable symbols successfully and val-idly received of the QKD protocol may be further improved whilst being provably secure and not impacting the security of the QKD protocol by having the first and second endpoint devices 104*a* and 104*b* share a "small amount" of informa-tion associated with the successfully received symbols at the first and second endpoint devices 104*a* and 104*b* (e.g. successfully received symbol positions) with the sender device 102.

Figure 5A:
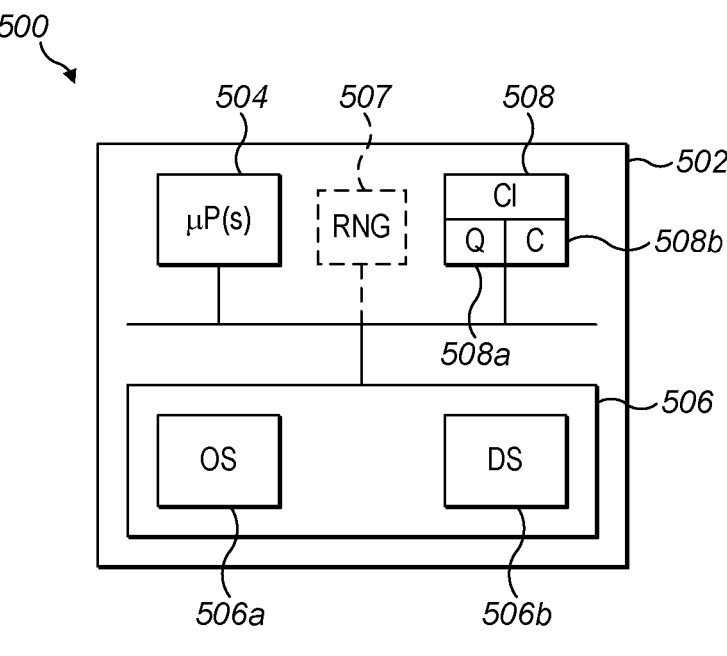
FIG. 5a is a schematic diagram illustrating an example computing system, device or apparatus according to some embodiments of the invention.

FIG. 5*a* is a schematic diagram of an example computing system 500 for use in implementing and/or performing a QKD control/switching process(es), endpoint device con-trol/switching process(es), and/or QKD switching system (s)/QTC(s)/CTRC(s) according to aspects of the invention as herein described with reference to FIGS. 1*a* to 4. Computing system 500 may be used to implement one or more aspects of the systems, apparatus, methods, process(es), device(s) and/or use cases as described with reference to FIGS. 1*a*-4*b*, combinations thereof, modifications thereto, as herein described and/or as the application demands. Computing system 500 includes a computing device or apparatus 502 that includes one or more processor unit(s) 504, memory unit 506 and a communication interface 508. The computing device or apparatus may also include, without limitation, for example, a first conventional or classical communication interface 508*a* and/or at least one or more second quantum communication interface 508*b*, and/or a random symbol/number generator 507 and the like. For example, the first conventional communication interface 508*a* may be adapted for communicating over classical communications networks and/or satellite networks and the at least one second quan-tum communication interface 508*b* may be adapted for communicating over quantum communication channels (e.g. using optical channels or other types of quantum channels). These may be used for performing QKD protocols, group key sharing, post-quantum cryptography, key exchange, and/or QKD process(es) and the like as herein described. The one or more processor unit(s) 504 are connected to the memory unit 506, the communication interface 508 (e.g. the first communication interface 508*a* and the second quantum communication interface 508*b*), and/or the random symbol/number generator 507. The communications interface 508 may connect the computing device or apparatus 502 with one or more other computing devices and/or apparatus (e.g. intermediary device, first and/or second device(s) or other n-th devices/stations) (not shown). The memory unit 506 may store one or more program instructions, code or com-ponents such as, byway of example only but not limited to, an operating system 506*a* for operating computing device 502, and a data store 506*b* for storing computer program instructions, executable code, code and/or components asso-ciated with implementing the functionality and/or one or more function(s) or functionality associated with one or more QKD switching process(es), endpoint device switch-ing process(es), and/or QKD switching system, QKD pro-tocol exchange mechanisms/systems and/or process(es), QKD protocol(s) and the like that may be configured for performing one or more of the process(es)/apparatus accord-ing to the invention, system(s)/platforms, combinations thereof, modifications there to, and/or as described herein with reference to at least any one of figure(s) 1*a* to 4*b* and/or as the application demands.

Figure 5B:
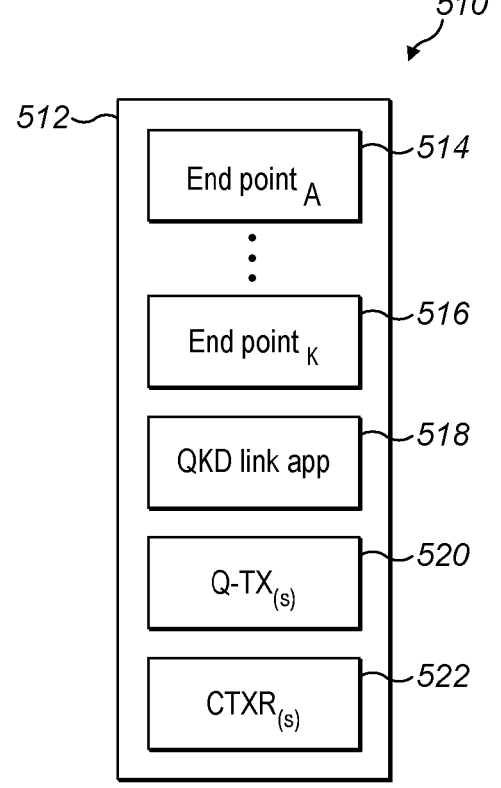
FIG. 5b is a schematic diagram illustrating an example system according to some embodiments of the invention.

FIG. 5*b* is a schematic diagram illustrating an example QKD system or network 510 including a QKD switching system 512 configured for performing a QKD protocol with at least two endpoint devices 514-516 via an QKD linking device or apparatus 518 (e.g. roadside cabinet). The QKD switching system 512 may also include a plurality of quan-tum transmitter (Q-TX(s)) component(s) 520, a plurality of classical transceiver (CTXR(s)) components 522, where the QKD switching system 512 operates to connect, for each endpoint device during performance of a QKD protocol, a selected Q-TX assigned to an endpoint device with the Q-channel of a QKD link assigned to the endpoint device, and/or operates to connect a selected CTRX assigned to the endpoint device with the C-channel of the QKD link assigned to the endpoint device, during and/or after two or more of the endpoint devices performs a QKD protocol for exchanging/transmitting QKD keys, group keys and the like as the application demands. The QTX component 520, CTRX components 522 may be controlled by the QKD linking apparatus/component 518 for managing the QKD links and connecting the endpoint devices 514 to 516 to a QKD network and the like. As an option, the QKD switching system 512 may further modified to include a plurality of quantum receiver components and/or quantum receivers in the QTX component 520, where one or more of the endpoint devices 514-516 may further modified to include a quantum transmitter for transmitting quantum transmissions to the quantum receivers of the QTX component 520 as the QKD protocol(s)/application demands. Each of the devices in the group of devices 514-516 and the QKD linking apparatus 518 perform corresponding/steps and/or reciprocal steps for performing a QKD protocol for exchanging keys, group keys, sharing a group key and/or any other type of exchange using a QKD protocol and the like using corresponding QKD links as described with reference to FIGS. 1a to 4. The QKD system 510 may be configured for performing at least one or more process(es)/method(s) according to the invention, system(s), platform(s), combinations thereof, modifications thereto, and/or as described herein with reference to at least any one of FIGS. 1a to 5a and/or as the application demands.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication byway of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A quantum key distributed, QKD, linking apparatus for use with at least two endpoint devices for linking said endpoint devices in a QKD network, the QKD linking apparatus comprising:
   a plurality of QKD links, each QKD link having a communication medium comprising a quantum channel and a classical channel, wherein each endpoint is assigned a QKD link connecting said each endpoint to the QKD linking apparatus;
   a quantum transmission component comprising a plurality of quantum transmitters, each quantum transmitter configured for transmitting quantum transmissions over a quantum channel of one of the QKD links;
   a classical transceiver component comprising a plurality of classical transceivers, each classical transceiver configured for transmitting classical data over a classical channel of one of the QKD links and configured for receiving classical data over the classical channel of said one of the QKD links; and
   a controller connected to the quantum transmission component and the classical transceiver component, the controller configured to:
      route or switch data generated for quantum transmission to an endpoint via a quantum transmitter assigned to the endpoint over a quantum channel of the QKD link of the endpoint;
      route or switch classical data for classical transmission to an endpoint via a classical transceiver assigned to the endpoint over a classical channel of the QKD link of the endpoint; and
      route or switch classical data received by a classical transceiver over the classical channel of the QKD link of an endpoint as required.

2. The QKD linking apparatus as claimed in claim 1, wherein each QKD link has a dedicated quantum transmitter from the quantum transmission component and a dedicated classical transceiver from the classical transceiver component for use over the quantum channel and classical channel of the QKD link.

3. The QKD linking apparatus as claimed in claim 1, wherein the quantum transmission component further comprising a plurality of quantum receivers, each quantum receiver configured for receiving quantum transmissions over a quantum channel of one of the QKD links, wherein one or more of the QKD links has a dedicated quantum receiver from the quantum transmission component and a dedicated classical transceiver from the classical transceiver component for use over the quantum channel and classical channel of the QKD link, wherein the controller is further configured to route or switch data received by a quantum receiver from a quantum transmission over the quantum channel of the QKD link of an endpoint device assigned to the quantum receiver.

4. The QKD linking apparatus as claimed in claim 1, the QKD linking apparatus further comprising a controller component configured for controlling the quantum transmission component for implementing one or more QKD protocols between the QKD linking apparatus and two or more of the endpoint devices, wherein:
   the controller component is configured to:
      assign an available quantum transmitter to an endpoint device for use over the QKD link of the endpoint device; and when implementing one of the QKD protocols between two or more endpoint devices each with an assigned quantum transmitters, direct the quantum transmission component to route or switch quantum transmissions for an endpoint device of the two or more endpoint devices to the quantum transmitter assigned to said endpoint device for transmitting said quantum transmissions over the quantum channel of the QKD link of the endpoint device.

5. The QKD linking apparatus as claimed in claim 1, the QKD linking apparatus further comprising a controller component configured for controlling the classical transmission and routing component for implementing one or more QKD protocols between the QKD linking apparatus and two or more of the endpoint devices, wherein:

the controller component is configured to:

assign an available classical transceiver to an endpoint device for use over the QKD link of the endpoint device;

when implementing one of the QKD protocols between two or more endpoint devices each with an assigned classical transceiver, direct the classical transmission and routing component to route or switch classical data for an endpoint device of the two or more endpoint devices to the classical transceiver assigned to said endpoint device to the classical channel of the QKD link of the endpoint device.

6. The QKD linking apparatus as claimed in claim 1, wherein, when one of the QKD protocols being performed between the QKD linking apparatus and at least two of the endpoint devices is complete, the controller is further configured to direct the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the two or more endpoint devices.

7. The QKD linking apparatus as claimed in claim 1, wherein the communication medium of each of the QKD links comprises at least one optical fiber, wherein the communication medium of at least one of the QKD links has a single optical fiber that is shared by the quantum and classical channels of said at least one QKD link.

8. The QKD linking apparatus as claimed in claim 1, wherein the QKD linking apparatus comprises a first QKD linking component comprising the quantum transmission component and controller, and a second QKD linking component comprising the classical transceiver routing component, wherein the first QKD linking component is housed in a secure tamper-proof enclosure and the first and second QKD linking components are located in a public facility or roadside cabinet.

9. The QKD linking apparatus as claimed in claim 1, further comprising a radio access network comprising a centralised unit and a plurality of radio masts/radio units configured to service a plurality of mobile units, said centralised unit and each radio mast/radio unit associated with an endpoint device and corresponding QKD link, said QKD link connected between said endpoint device and said quantum transmission component and said classical transmission routing component, wherein the QKD linking apparatus is located in a distributed unit of the radio access network.

10. The QKD linking apparatus as claimed in claim 1, wherein the QKD linking apparatus is an untrusted node and the QKD protocols performed by said QKD linking apparatus and said two or more endpoint devices are configured to ensure the QKD linking apparatus cannot derive the resulting QKD keys or keys exchanged output from the QKD protocols and used for securing communications between the two or more endpoint devices.

11. The QKD linking apparatus as claimed in claim 1, wherein the quantum transmissions to each endpoint device of two or more endpoint devices performing a QKD protocol for exchanging a QKD key therebetween may be performed simultaneously each quantum transmission using a different quantum transmitter assigned to said each endpoint device.

12. The QKD linking apparatus as claimed in claim 1, wherein the quantum transmissions to each endpoint device of two or more endpoint devices performing a QKD protocol for exchanging a QKD key therebetween may be performed sequentially using a different quantum transmitter assigned to said each endpoint device, wherein the controller directs the quantum transmission component to route or switch the next quantum transmission for an endpoint device to the corresponding quantum transmitter assigned to said endpoint device for transmission over the quantum channel of the QKD link of said endpoint device when the previous or current quantum transmission for another endpoint device has completed.

13. The QKD linking apparatus as claimed in claim 1, wherein the quantum transmission component includes a plurality of quantum receivers coupled to the quantum channel of corresponding QKD links of endpoint devices, wherein quantum transmissions received from each endpoint device of two or more endpoint devices performing a QKD protocol for exchanging a QKD key therebetween may be performed simultaneously, each reception of a quantum transmission using a different quantum receiver assigned to said each endpoint device.

14. The QKD linking apparatus as claimed in claim 1, wherein the quantum transmission component includes a plurality of quantum receivers coupled to the quantum channel of corresponding QKD links of endpoint devices, and wherein the quantum transmissions from each endpoint device of two or more endpoint devices performing a QKD protocol for exchanging a QKD key therebetween may be performed sequentially using a different quantum receiver assigned to said each endpoint device, wherein the controller directs the quantum transmission component to route or switch the next expected quantum transmission from an endpoint device to the corresponding quantum receiver assigned to said endpoint device for reception of the quantum transmission over the quantum channel of the QKD link from said endpoint device when the previous or current quantum transmission from another endpoint device has completed.

15. The QKD linking apparatus as claimed in claim 1, further comprising a random number generator for generating random quantum bits or keys for quantum transmission, wherein the QKD linking apparatus further deletes a generated random set of quantum bits or key once it has been transmitted to an endpoint device using quantum transmissions.

16. A computer-implemented method for controlling a quantum key distributed, QKD, linking apparatus for use in linking at least two endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum transmission component comprising a plurality of quantum transmitters, each quantum transmitter configured for transmitting quantum transmissions over a quantum channel of one of the QKD links;

a classical transceiver component comprising a plurality of classical transceivers, each classical transceiver configured for transmitting classical data over a classical channel of one of the QKD links and configured for receiving classical data over the classical channel of said one of the QKD links; and wherein the method further comprising:

routing or switching data generated for quantum transmission to an endpoint via a quantum transmitter assigned to the endpoint over a quantum channel of the QKD link of the endpoint;

routing or switching classical data for classical transmission to an endpoint via a classical transceiver assigned to the endpoint over a classical channel of the QKD link of the endpoint; and routing or switching classical data received by a classical transceiver over the classical channel of the QKD link of an endpoint as required.

17. The computer-implemented method as claimed in claim 16, further comprising:

assigning an available quantum transmitter to an endpoint device for use over the QKD link of the endpoint device; and when implementing one of the QKD protocols between two or more endpoint devices each with an assigned quantum transmitters, directing the quantum transmission component to route or switch quantum transmissions for an endpoint device of the two or more endpoint devices to the quantum transmitter assigned to said endpoint device for transmitting said quantum transmissions over the quantum channel of the QKD link of the endpoint device.

18. The computer-implemented method as claimed in claim 16, further comprising assigning an available classical transceiver to an endpoint device for use over the QKD link of the endpoint device;

when implementing one of the QKD protocols between two or more endpoint devices each with an assigned classical transceiver, directing the classical transmission and routing component to route or switch classical data for an endpoint device of the two or more endpoint devices to the classical transceiver assigned to said endpoint device to the classical channel of the QKD link of the endpoint device.

19. The computer-implemented method as claimed in claim 16, when one of the QKD protocols are being performed between the QKD linking apparatus and at least two of the endpoint devices is complete, the method further comprising, for the two or more endpoint devices, directing the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the two or more endpoint devices.

20. A system comprising:

a plurality of endpoint devices; and a quantum key distributed, QKD, linking apparatus for use with the plurality of endpoint devices for linking said endpoint devices in a QKD network, the QKD linking apparatus comprising:

a plurality of QKD links, each QKD link having a communication medium comprising a quantum channel and a classical channel, wherein each endpoint device of the plurality of endpoint devices is assigned a QKD link connecting said each endpoint device to the QKD linking apparatus;

a quantum transmission component comprising a plurality of quantum transmitters, each quantum transmitter configured for transmitting quantum transmissions over a quantum channel of one of the QKD links;

a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum transmission component and the classical transceiver component, the controller configured to:

route or switch data generated for quantum transmission to an endpoint device of the plurality of endpoint devices via a quantum transmitter assigned to the endpoint device over a quantum channel of the QKD link of the endpoint device;

route or switch classical data for classical transmission to an endpoint device of the plurality of endpoint devices via a classical transceiver assigned to the endpoint device over a classical channel of the QKD link of the endpoint device; and route or switch classical data received by a classical transceiver over the classical channel of the QKD link of an endpoint device of the plurality of endpoint devices as required.

* * * * *